US011921613B2

(12) United States Patent
Lydick

(10) Patent No.: US 11,921,613 B2
(45) Date of Patent: Mar. 5, 2024

(54) AUTOMATIC PERFORMANCE TELEMETRY

(71) Applicant: MICROSOFT TECHNOLOGY LICENSING, LLC, Redmond, WA (US)

(72) Inventor: Neil Evan Lydick, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 235 days.

(21) Appl. No.: 17/306,282

(22) Filed: May 3, 2021

(65) Prior Publication Data

US 2022/0350725 A1 Nov. 3, 2022

(51) Int. Cl.
*G06F 8/30* (2018.01)
*G06F 8/41* (2018.01)
(Continued)

(52) U.S. Cl.
CPC ............ *G06F 11/3495* (2013.01); *G06F 8/30* (2013.01); *G06F 8/48* (2013.01); *G06F 9/45558* (2013.01);
(Continued)

(58) Field of Classification Search
None
See application file for complete search history.

(56) References Cited

U.S. PATENT DOCUMENTS 6,016,466 A * 1/2000 Guinther ............. G06F 11/3644
714/39
6,721,941 B1 * 4/2004 Morshed ............. G06F 11/3612
717/124

(Continued)

FOREIGN PATENT DOCUMENTS

EP 1012722 A1 6/2000

OTHER PUBLICATIONS

Activity.Id Property, Retrieved from: https://docs.microsoft.com/en-US/dotnet/api/system.diagnostics.activity.id?view=net-5.0, Retrieved Date: Feb. 12, 2021, 2 Pages.

(Continued)

*Primary Examiner* — Matthew J Brophy

(74) *Attorney, Agent, or Firm* — David W. Foster; Newport IP, LLC

(57) ABSTRACT

The disclosed techniques assist in diagnosing performance problems of a software application. A profiling module dynamically instruments the application at runtime by intercepting a request to compile one of the application's functions and augmenting the function with performance measuring code. This way, instrumentation is installed without recompiling the application. The execution time of a synchronous function is tracked by adding a local variable that stores function entry time, and by inserting code at each function exit point that computes the elapsed time. The execution time of an async function that executes across multiple threads is measured by repurposing a state machine value to also store the initial function entry time. Instrumented functions that are executed at a rate exceeding a threshold are un-instrumented to avoid self-inflicted performance problems. Function invocations associated with a particular activity, such as responding to a particular web request, may be correlated.

18 Claims, 21 Drawing Sheets

(51) Int. Cl.
  G06F 9/455      (2018.01)
  G06F 9/54       (2006.01)
  G06F 11/30      (2006.01)
  G06F 11/34      (2006.01)

(52) U.S. Cl.
  CPC .. G06F 11/302 (2013.01); *G06F 2009/45591* (2013.01); *G06F 9/541* (2013.01)

(56) References Cited

U.S. PATENT DOCUMENTS

| | | | | |
|---|---|---|---|---|
| 7,275,239 | B2* | 9/2007 | Cuomo | G06F 11/3624 |
| | | | | 717/130 |
| 7,293,259 | B1* | 11/2007 | Dmitriev | G06F 11/3644 |
| | | | | 717/130 |
| 7,293,260 | B1* | 11/2007 | Dmitriev | G06F 11/3644 |
| | | | | 717/130 |
| 9,703,670 | B2* | 7/2017 | Ajith Kumar | G06F 11/3082 |
| 11,256,590 | B1* | 2/2022 | Hulick, Jr. | G06Q 10/06 |
| 2003/0056199 | A1* | 3/2003 | Li | G06F 11/323 |
| | | | | 714/E11.181 |
| 2004/0158819 | A1* | 8/2004 | Cuomo | G06F 11/3624 |
| | | | | 717/130 |
| 2022/0350725 | A1* | 11/2022 | Lydick | G06F 8/48 |

OTHER PUBLICATIONS

Collect Windows Performance Counters, Retrieved from: https://genevamondocs.azurewebsites.net/collect/platform/windows/perfcounter.html, Retrieved Date: Feb. 12, 2021, 5 Pages.

EventSource.SetCurrentThreadActivityId Method, Retrieved from: https://docs.microsoft.com/en-us/dotnet/api/system.diagnostics.tracing.eventsource.setcurrentthreadactivityid?view=net-5.0, Retrieved Date: Feb. 12, 2021, 3 Pages.

Profiling API Samples for CoreCLR, Retrieved from: https://github.com/microsoft/clr-samples/tree/master/ProfilingAPI, Nov. 19, 2020, 2 Pages.

Profiling Types, Retrieved from: https://web.archive.org/web/20210119085500if_/https://www.jetbrains.com/help/profiler/Profiling_Guidelines_Choosing_the_Right_Profiling_Mode.html, Jan. 19, 2021, 2 Pages.

Gayhardt, et al., "Unified cross-component transaction diagnostics", Retrieved from: https://docs.microsoft.com/en-us/azure/azure-monitor/app/transaction-diagnostics#transaction-diagnostics-experience, Jan. 19, 2018, 6 pages.

Weininger, et al., "Profile production applications in Azure with Application Insights", Retrieved from: https://docs.microsoft.com/en-us/azure/azure-monitor/app/profiler-overview, Aug. 6, 2018, 7 Pages.

Whang, et al., "COR_PRF_MONITOR Enumeration", Retrieved from: https://docs.microsoft.com/en-us/dotnet/framework/unmanaged-api/profiling/cor-prf-monitor-enumeration, Mar. 30, 2017, 8 Pages.

Whang, et al., "ICorProfilerCallback Interface", Retrieved from: https://docs.microsoft.com/en-us/dotnet/framework/unmanaged-api/profiling/icorprofilercallback-interface, May 30, 2017, 7 pages.

Whang, et al., "Profiling Interfaces", Retrieved from: https://docs.microsoft.com/en-us/dotnet/framework/unmanaged-api/profiling/profiling-interfaces, Apr. 10, 2018, 3 Pages.

Stackify, https://stackify.com/content/profiler/, 2020, 14 pages.

"International Search Report and Written Opinion Issued in PCT Application No. PCT/US22/024129", dated Aug. 30, 2022, 23 Pages.

"Invitation to Pay Additional Fee Issued in PCT Application No. PCT/US22/024129", dated Jul. 8, 2022, 15 Pages.

Office Action received for EP Application No. 22719729.0, dated Dec. 12, 2023, 3 Pages.

* cited by examiner

```
class ParseEngine
{
    public TCollection Templates { get; } public int Tokenize(string text)
    {
        STOPWATCH SW;
        SW.StartNew();

var results = new TokenizerResult();

foreach (name in Templates.Names)
        {
            if (!Templates.Get(name, Ts))
            {
                LOG("Tokenize", SW.Elapsed);
                return results;
            } result = Tokenize(t, input);
            results.Results.Add(result);
        }

LOG("Tokenize", SW.Elapsed);
        return results;
    }
}
```

MANUALLY INSTRUMENTED CODE 104

TIMER INITIALIZATION 106

LOG ELAPSED TIME 108A

LOG ELAPSED TIME 108B

```
class ParseEngine
{
    public TCollection Templates { get; } public int Tokenize(string text)
    {
        var results = new TokenizerResult();

foreach (name in Templates.Names)
        {
            if (!Templates.Get(name, Ts))
            {
                return results;
            } result = Tokenize(t, input);
            results.Results.Add(result);
        } return results;
    }
}
```

UNINSTRUMENTED CODE 102

FIG. 1

TARGET FUNCTION
404

```
.method public hidebysig instance int32
        bar(int32 existing_param) cil
managed
{
   // Begins at RVA 0x205c
   // Code size 45
   .maxstack  2
   .locals init (int32 V_0,
            int32 V_1,
            bool V_2)
   IL_0000:  nop
   IL_0001:  ldc.i4.1
   IL_0002:  stloc.0
   IL_0003:  br.s      IL_001c IL_0005:  nop
   IL_0006:  ldloc.0
   IL_0007:  ldc.i4.s   24
   IL_0009:  cgt
   IL_000b:  ldc.i4.0
   IL_000c:  ceq
   IL_000e:  stloc.2
   IL_000f:  ldloc.2
   IL_0010:  brtrue.s IL_0017

IL_0012:  nop
   IL_0013:  ldc.i4.1
   IL_0014:  stloc.1
   IL_0015:  ret

...

IL_0024:  ldc.i4.0
   IL_0025:  stloc.1
   IL_0026:  br.s      IL_0028

IL_0028:  ldloc.1
   IL_0029:  ret
} // end of method foo::bar
```

FIG. 4A

MODIFIED FUNCTION 422

FUNCTION SIGNATURE 420A

```
.method public hidebysig instance int32
          bar(int32 existing_param) cil
managed
{
   // Begins at RVA 0x205c
   // Code size 45
   .maxstack  2
```

FUNCTION SIGNATURE 420B

```
   .locals init (int32 V_0,
             int32 V_1,
             bool V_2,
```

ADDITIONAL LOCAL VARIABLE 406

```
             int64 entry_time)
```

ADDED ENTRY INSTRUCTIONS 408

```
   IL_0000:  ldc_i8 &MethodEnter
   IL_0001:  calli (MethodEnterSig)
   IL_0002:  stloc entry_time
   IL_0003:  nop
   IL_0004:  ldc.i4.1
   IL_0005:  stloc.0
   IL_0006:  br.s      IL_001f IL_0008:  nop
   IL_0009:  ldloc.0
   IL_000a:  ldc.i4.s    24
   IL_000c:  cgt
   IL_000d:  ldc.i4.0
   IL_000f:  ceq
   IL_0011:  stloc.2
   IL_0012:  ldloc.2
   IL_0013:  brtrue.s IL_001a IL_0015:  nop
   IL_0016:  ldc.i4.1
   IL_0017:  stloc.1
   IL_0018:  ret

...

IL_0027:  ldc.i4.0
   IL_0028:  stloc.1
   IL_0029:  br.s      IL_002b

IL_002b:  ldloc.1
   IL_002c:  ret
} // end of method foo::bar
```

AUTO-INSTRUMENTED BYTECODE 404A

```
.method public hidebysig instance int32
        bar(int32 existing_param) cil
managed
{
    // Begins at RVA 0x205c
    // Code size 45
    .maxstack  2
    .locals init (int32 V_0,
            int32 V_1,
            bool V_2,
            int64 entry_time)        ← ADDITIONAL LOCAL VARIABLE 406
    IL_0000:  ldc_i8 &MethodEnter    ⎫
    IL_0001:  calli (MethodEnterSig) ⎬ ADDED ENTRY INSTRUCTIONS 408
    IL_0002:  stloc entry_time       ⎭
    IL_0003:  nop
    IL_0004:  ldc.i4.1
    IL_0005:  stloc.0
    IL_0006:  br.s       IL_0029

IL_0008:  nop
    IL_0009:  ldloc.0
    IL_000a:  ldc.i4.s   24
    IL_000c:  cgt
    IL_000d:  ldc.i4.0
    IL_000f:  ceq
    IL_0011:  stloc.2
    IL_0012:  ldloc.2
    IL_0013:  brtrue.s IL_0024

IL_0015:  nop
    IL_0016:  ldc.i4.1
    IL_0017:  stloc.1
    IL_0018:  ldc_i8 (FunctionId)    ⎫
    IL_0019:  ldloc (entry_time)     ⎬ ADDED EXIT INSTRUCTIONS 410A
    IL_001a:  ldc_i8 &MethodExit     ⎪
    IL_001b:  calli (MethodExitSig)  ⎭
    IL_001c:  ret                    ← RETURN INSTRUCTION 412

...

IL_002b:  ldloc.1
    IL_002c:  ldc_i8 (FunctionId)    ⎫
    IL_002d:  ldloc (entry_time)     ⎬ ADDED EXIT INSTRUCTIONS 410B
    IL_002e:  ldc_i8 &MethodExit     ⎪
    IL_002f:  calli (MethodExitSig)  ⎭
    IL_0030:  ret
} // end of method foo::bar
```

AUTO-INSTRUMENTED BYTECODE 404B

METHODENTER 502

```
int MethodEnter()
{
    int timestamp;
    RetrieveSystemTime(&timestamp);
    return timestamp;
}
```

METHODEXIT 504

```
void MethodExit(FunctionID functionId, int timestamp)
{
    if (RetrieveActivityIdsHasBeenJITCompiled)
    {
        InvokeRetrieveActivityIdsNativeFunction(functionId,
            timestamp);
    }
}
```

METHODEXIT-
CONTINUATION 506

```
void MethodExitContinuation(FunctionID functionId, uint timestamp, GUID*
activityId, GUID* rootActivityId)
{
    int elapsed_time = GET_ELAPSED_MILLISECONDS_FROM(timestamp);
    auto methodName = funcIdToMethodName[functionId];
    …
    Trace(elapsed_time, methodName, activityId, rootActivityId);
}
```

ACTIVITY ROOT
METHOD ENTRY 508

```
int RootMethodEnter()
{
    if (SetRootActivityIdHasBeenJitCompiled)
    {
        InvokeSetRootActivityIdNativeFunction(new Guid());
    } return MethodEnter();
}
```

FIG. 5

TELEMETRY HELPER
602

```
static class TelemetryHelper
{
    static AsyncLocal<Guid> activityId
            new AsyncLocal<Guid>();

static AsyncLocal<Guid> rootActivityId
            new AsyncLocal<Guid>();

static void RetrieveActivityIds(
            ulong functionId, ulong counterStart)
    {
        // pass activityIds to MethodExitContinuation
        Guid aId = activityId.Value;
        Guid root_aId = rootActivityId.Value;
        Native.MethodExitContinuation(functionId,
                counterStart, aId , root_aId);
    } static void SetActivityId(Guid guid)
    {
        // save the application-defined activity ID
        activityId.Value = guid;
    } static void SetRootActivityId(Guid guid)
    {
        // save the auto-defined activity ID
        rootActivityId.Value = guid;
    } static void Initialize()
    {
        // Trigger JIT compile of "RetrieveActivityIds"
        TelemetryHelper.RetrieveActivityIds(0, 0);
    }
}
```

- APPLICATION DEFINED ACTIVITYID 604
- AUTO-GENERATED ACTIVITYID 606
- RETRIEVE ACTIVITYIDS FUNTION 608
- SETACTIVITYID FUNCTION 610
- SETRROOT ACTIVITYID FUNCTION 612
- INITIALIZE FUNCTION 614

REWRITTEN COMPILER-GENERATED ASYNC STATE MACHINE CODE 1102

STATE MAP 1110

```
class ButtonClickHandlerStateMachine : IAsyncStateMachine
{
    MoveNext()
    {
        TaskAwaiter awaiter1, awaiter2;

if (this.state == -1)
        {
            int timestamp 1106;
            RetrieveSystemTime(&timestamp) 1108;
            this.state =CreateStateTimeMapEntry(0,timestamp)
        } if (this.state == 0)
        {
            awaiter1 = _httpClient.GetURL().GetAwaiter();
            this.state = 1;
            awaiter1.OnCompletionExecute(this.MoveNext);
        } else if (this.state == 1)
        {
            awaiter2 =
                _httpClient.GetStringAsync(URL).GetAwaiter();
            this.state = 2;
            awaiter2.OnCompletionExecute(this.MoveNext);
        } else if (this.state == 2)
        {
            DisplayHtml(stringData);
            this.state = -2;
        } else if (this.state == -2)
        {
            this.SetResult();
        } return;
    }
}
```

- INITIALIZATION SECTION 1018
- INITIALIZE STATE-TIME MAP 1104
- REFERENCE TO ENTRY IN DATA STRUCTURE 1106

REWRITTEN COMPILER-
GENERATED ASYNC
STATE MACHINE CODE
1102

FIG. 11B

```
class ButtonClickHandlerStateMachine : IAsyncStateMachine
{
    MoveNext()
    {
        TaskAwaiter awaiter1, awaiter2;

if (this.state == -1)
        {
            int timestamp;
            RetrieveSystemTime(&timestamp);
            this.state = CreateStateTimeMapEntry(0,timestamp);
        } else if (this.state g_STMap[this.state].state == 0)
        {
            awaiter1 = _httpClient.GetURL().GetAwaiter();
            this.state g_STMap[this.state].state = 1;
            awaiter1.OnCompletionExecute(this.MoveNext);
        } else if (this.state g_STMap[this.state].state == 1)
        {
            awaiter2 =
               _httpClient.GetStringAsync(URL).GetAwaiter();
            this.state g_STMap[this.state].state = 2;
            awaiter2.OnCompletionExecute(this.MoveNext);
        } else if (this.state g_STMap[this.state].state == 2)
        {
            DoSomethingWithData(stringData);
            this.state g_STMap[this.state].state = -2;
        } else if (this.state g_STMap[this.state].state == -2)
        {
            this.SetResult();
        } return;
    }
}
```

REPLACEMENT
LOAD
INSTRUCTIONS
1112

REPLACEMENT
STORE
INSTRUCTIONS
1114

FIG. 11C

REWRITTEN COMPILER-GENERATED
ASYNC STATE MACHINE CODE 1102

```
class ButtonClickHandlerStateMachine : IAsyncStateMachine
{
    MoveNext() {
        TaskAwaiter awaiter1, awaiter2;

if (this.state == -1) {
            int timestamp;
            RetrieveSystemTime(&timestamp);
            this.state = CreateStateTimeMapEntry(0,timestamp);
        } else if (g_STMap[this.state].state == 0) {
            awaiter1 = _httpClient.GetURL().GetAwaiter();
            g_STMap[this.state].state = 1;
            awaiter1.OnCompletionExecute(this.MoveNext);
        } else if (g_STMap[this.state].state == 1) {
            awaiter2 =
                _httpClient.GetStringAsync(URL).GetAwaiter();
            g_STMap[this.state].state = 2;
            awaiter2.OnCompletionExecute(this.MoveNext);
        } else if (g_STMap[this.state].state == 2) {
            DoSomethingWithData(stringData);
            g_STMap[this.state].state = -2;
        } else if (g_STMap[this.state].state == -2)
        {
            this.SetResult();
        } int elapsed_time =
            GET_ELAPSED_MILLISECONDS_FROM(
                g_STMap[this.state].timestamp);

Trace(elapsed_time, "async_ButtonClickHandler",
            g_STMap[this.state].state);

return;
    }
}
```

COMPUTE ELAPSED TIME 1116

EMIT ELAPSED EXECUTION TIME 1118

CONFIG FILE 212

```
// List of modules to instrument 1304
[API.dll]
[Entity.DataAccess.dll]

// The module list can include external libraries 1306
[Microsoft.AspNetCore.dll]
[System.Net.Http.dll]

// Per-module auto-uninstrument thresholds 1308
[Microsoft.OData.Core.dll]
AutoUninstrumentMicrosecondThreshold=10000 1310
AutoUninstrumentInvocationCount=100 1312

// Symbols excluded from instrumentation 1314
// e.g. constructors
ExcludeSymbols="::.cctor","::.ctor"

// Minimum elapsed time needed to log an invocation 1316
LogIfElapsedTimeGreaterThanMilliseconds=0

// Limit to the number of async intermediate states 1318
LogAsyncIntermediateStateIfCountLessThan=5

// The AsyncStateMachine base class 1320
// used to determine if a function is async
AsyncInterface=CompilerServices.IAsyncStateMachine // The function 1322 called once per-activity
[Microsoft.AspNetCore.Server.IIS.dll]
RootMethod=AspNetCore.Server.IIS.dll$$
     AspNetCore.Server.IIS.Core.IISHttpContext::Execute
```

FIG. 13

SAMPLE LOG 1402

```
INITIAL STATE    0166 ms | Application.dll$$<ButtonClickHandler>d__1::MoveNext
1404             0166 ms | [State: 0, MethodName: async_Application.dll$$<ButtonClickHandler
                 0171 ms | Application.dll$$Application.Program::ButtonClickHandler
                 0023 ms | Application.dll$$<ButtonClickHandler>d__1::MoveNext
INTERMEDIATE     1192 ms | [State: 1, MethodName: async_Application.dll$$<ButtonClickHandler>d__1::MoveNext]
STATES 1406      0035 ms | Application.dll$$<ButtonClickHandler>d__1::MoveNext
                 2092 ms | [State: 2, MethodName: async_Application.dll$$<ButtonClickHandler>d__1::MoveNext]
                 Downloaded HTML is: <html><head></head><body>breaking news...</body></html>
FINAL STATE      0001 ms | Application.dll$$<ButtonClickHandler>d__1::MoveNext
1408             3194 ms | [State: -2, MethodName: async_Application.dll$$<ButtonClickHandler>d__1::MoveNext]
```

INITIAL STATE 1404

FIG. 14

AUTOMATIC PERFORMANCE TELEMETRY

BACKGROUND

Computer software often exhibits poor performance. Poor performing software applications may result in sluggish response times that degrade customer experiences. Poor performing applications may also consume large amounts of computing resources, increasing operational and environmental costs. Existing techniques for diagnosing performance problems are time-consuming, error-prone, and often require repeated recompilation and redeployment of the application exhibiting the problem.

Diagnosing the root cause of a performance problem is challenging even when a developer has access to the application's source code and when the problem can be isolated in a test environment. Diagnosing the root cause of a performance problem is even more challenging in a production environment, where modifying the application may be impractical if not impossible. Existing techniques are also unable to isolate performance problems within libraries or other modules for which source code is unavailable.

One approach to diagnosing performance problems is to manually instrument the source code of the application. Instrumenting the source code refers to adding statements to the source code that measure performance of a section of code. For example, a pair of timer statements may measure how long it takes to execute a particular section of code. Instrumentation also refers to adding logging statements to the source code. For example, a logging statement may write the elapsed time to a log file for later analysis. When the application is compiled, the performance measuring and logging statements are translated into executable code that is part of the application itself.

However, manually instrumenting an application has many drawbacks. Typing out the instrumentation statements is labor-intensive. Instrumentation statements obscure the logic of the code being measured. Developers are forced to decide at compile time what to measure—effectively guessing which sections of code will be relevant to diagnosing the performance problem. Changing which sections of code to measure requires a recompile, and potentially a redeployment, before taking effect. Developers often fail to manually instrument revealing code sections, such as long running sections of code, while over-instrumenting code that is executed many times per second, e.g. loops. When tight loops are over-instrumented, the instrumentation code itself can become a source of performance problems. Another drawback to manual instrumentation is that developers must be able to build the instrumented module from source. This precludes instrumenting third party libraries that do not release source code or that are impractical to build from source.

It is with respect to these and other considerations that the disclosure made herein is presented.

SUMMARY

The disclosed techniques assist in diagnosing performance problems of a software application. Generally described, a system dynamically instruments the software application without modifying the application's source code. Similar to manual instrumentation, a dynamically instrumented application measures how long one or more sections of code take to execute. However, by not requiring a change to the source code, dynamic instrumentation does not require recompilation or redeployment. This allows developers to quickly iterate over different instrumentation configurations to zero-in on the performance problem.

In some configurations, an application is instrumented by injecting executable code into the application as the application executes. The injected executable code becomes part of the application's executable code, measuring an elapsed execution time of a section of code. Injecting executable code as the application executes is distinct from adding instrumentation statements to an application's source code. Source code must be compiled or interpreted before it can be executed. In contrast, executable code can be directly executed by a machine. By not requiring the modification of source code, third party libraries not built from source may be instrumented.

In some configurations, the sections of code to be monitored are listed in a configuration file. Changing the sections of code listed in the configuration file changes the sections of code that are instrumented, without recompiling or redeploying the application. These changes may occur within a single instance of the application, e.g. dynamically un-instrumenting or re-instrumenting a section of code as the application executes. Additionally, or alternatively, these changes may take effect the next time the application is run.

In some configurations, a profiler module executing within the application instruments a section of code by intercepting a request to just-in-time (JIT) compile that section of code and replacing it with an instrumented version. This technique applies to applications that execute on a virtual machine, such as the Java Virtual Machine or the Microsoft® Common Language Runtime. Applications that target virtual machines are compiled by their authors from source code into intermediate language executable code (IL). At runtime, the virtual machine JIT-compiles the IL into processor-specific instructions. By intercepting and re-writing a section of IL code before it is JIT compiled, that section of code may be instrumented without modifying the application's source code. While the disclosed embodiments are primarily discussed with reference to IL that is JIT compiled by a virtual machine, the same techniques apply to interpreted code, e.g. Python or JavaScript code, as well as native processor-specific code run within an instrumentation framework, such as Valgrind.

Instrumentation code may be dynamically updated or removed as the application executes. To update or remove instrumentation code, the profiler module asks the virtual machine to re-JIT a section of code. The profiler module then intercepts the virtual machine's subsequent request to JIT that section of code. The profiler module may then apply a different instrumentation, effectively updating the existing instrumentation, or apply no instrumentation at all, effectively removing the existing instrumentation.

In some embodiments, a section of code refers to a function. The profiler module rewrites the target function's IL to determine an entry time and an exit time for each invocation. Specifically, the profiler module adds code to the target function's IL that determines a system time upon entering the target function, storing the value in a newly added local variable. The profiler module also adds code to determine the system time at each of the function's return points. The instrumentation code inserted at a return point may then compute the elapsed time, apply any thresholds or other criteria, and emit the results to a log.

In some configurations, asynchronous functions receive additional instrumentation code to measure performance across re-entries. Synchronous functions are functions that do not return until their work is complete. As such, the entry time of a synchronous function may be stored in a local variable, which remains available until the function has completed. In contrast, asynchronous functions (also referred to as 'async' functions) are re-entered multiple times while performing a single invocation, often on different threads. A local variable of one re-entrance is not available to another, and so a local variable cannot store an initial entry time across re-entrances. To overcome this challenge, a state machine variable used to track progress of the async function across re-entrances is repurposed to also store the initial entry time. This state machine variable is available to all re-entrances, enabling instrumentation code at a return instruction of a final re-entrance to compute the elapsed execution time from the initial entry time.

In some embodiments, the operation of the injected monitoring code is configurable. Whether and how to measure execution time of a section of code may be configured, as well as whether and how to report the measured values. For example, the injected monitoring code may be configured to only log a measurement if the elapsed time is greater than a threshold value. This may reduce the volume of data emitted in the log file. Additionally or alternatively, the injected monitoring code may be configured to echo telemetry data to a user interface for real-time consumption by a developer.

The injected monitoring code may also be configured to detect if a monitored section of code is executed at a rate exceeding a defined threshold. In these circumstances, the performance measurement code itself could become a performance issue. In response, the profiler module may pause logging, pause measuring elapsed execution time, instrument a calling function instead of the rate-exceeding section of code, or remove the instrumentation code altogether. In this way, over-instrumentation can be remedied automatically, without having to restart the application.

In some configurations, the application performs activities such as responding to web requests, database queries, user interface events, or the like. Developers may wish to know which invocations of instrumented code are associated with a particular activity. For example, for an application that responds to web requests, developers may wish to know which invocations of instrumented code are associated with a particular web client.

To this end, the profiler module exposes an activity-identifier function that associates a custom, application-provided activity identifier with a current activity. In some configurations, the current activity is any processing performed by a thread, async function, web session, or other execution context that invoked the activity-identifier function. The current activity ends when the activity-identifier function is invoked again from the same execution context. For example, if a response to a web request is processed by a thread, the application may invoke the activity-identifier function to associate an identifier with any function invocations made by that thread. When the response is complete, the application may re-use the thread to respond to a new web request. The same thread may then invoke the activity-identifier function with a new identifier. Subsequent function invocations made by the thread will be associated with the new identifier.

In some configurations, the activity-identifier function stores identifiers in per-execution-context variables. A per-execution-context variable maintains different values for different execution contexts, such as different threads, different async functions, different user-sessions, etc. Examples of per-execution context variables are thread local variables, async local variables, session variables, or any other variable that maintains different values when accessed from different execution contexts.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 illustrates an example of a traditional approach to manual code instrumentation.

FIG. 4A illustrates a listing of executable instructions of a function.

FIG. 4B illustrates a listing of executable instructions of the function shown in FIG. 4A after inserting instructions that store a timestamp in a local variable.

FIG. 4C illustrates a listing of executable instructions of the function shown in FIG. 4A after inserting instructions that compute an elapsed execution time as the function returns.

FIG. 5 illustrates functions provided by a profiler module that are invoked by instructions inserted into a target function.

FIG. 6 illustrates a listing of managed code functions that execute within a virtual machine to determine which activity a function invocation is associated with.

FIG. 11A illustrates a listing of the asynchronous function shown in FIG. 10A after inserting instructions that repurpose the state machine variable to store a key to a map that contains entry times and true state machine values.

FIG. 11B illustrates a listing of the asynchronous function shown in FIG. 10A after replacing instructions that access the state machine variable with instructions that access a state machine value stored in the map.

FIG. 11C illustrates a listing of the asynchronous function shown in FIG. 10A after inserting instructions that compute an elapsed execution time.

FIG. 13 illustrates a listing of a configuration file used to configure execution of the profiler module.

FIG. 14 illustrates a listing of a log generated by the profiler module.

DETAILED DESCRIPTION

Figure 2:
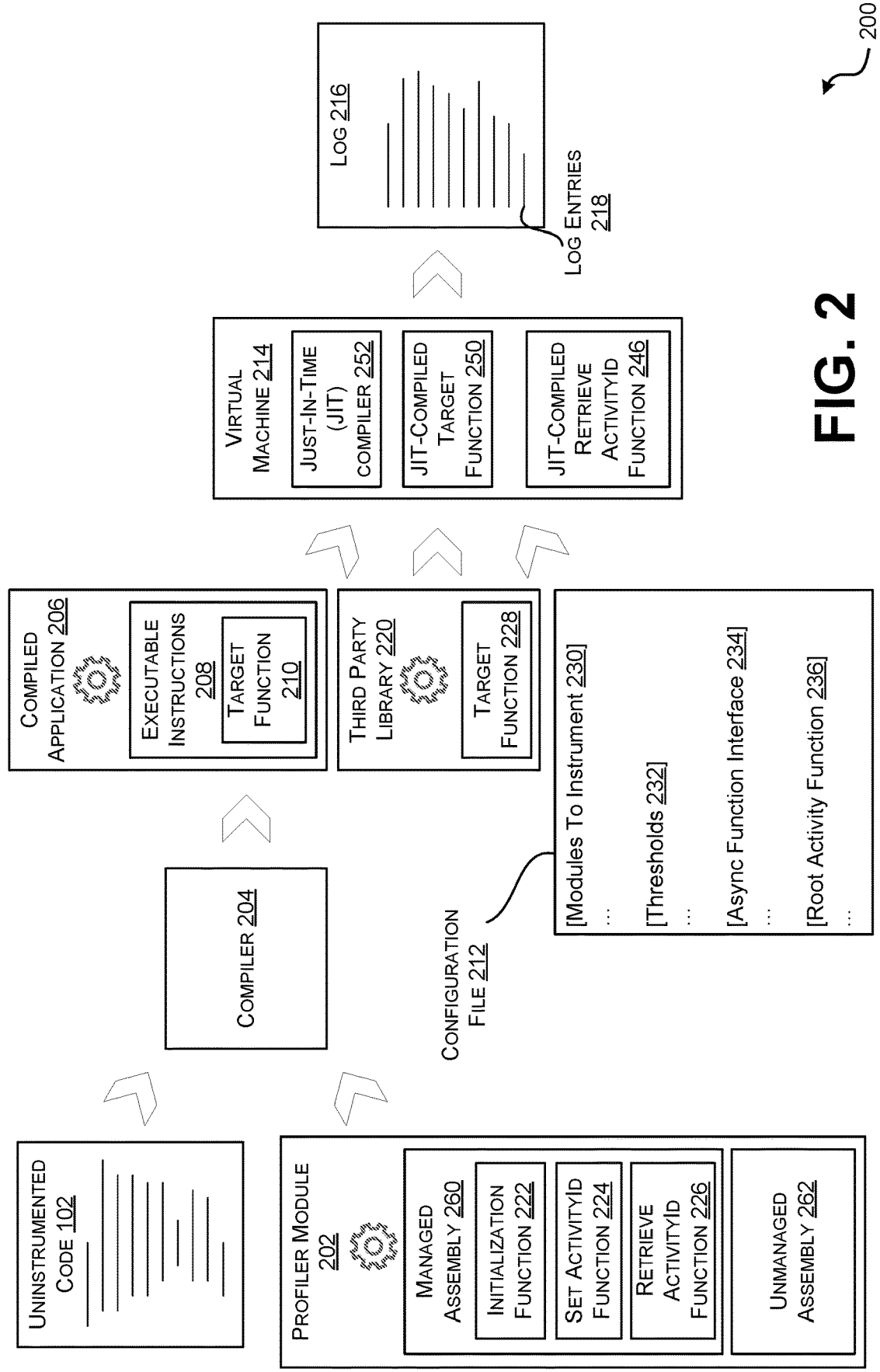
FIG. 2 illustrates a block diagram illustrating aspects of an approach for automatic performance telemetry.

The techniques described herein provide systems for optimizing the use of computing resources by dynamically instrumenting a software application. Computing resource usage is optimized by enabling software developers to adjust which code sections of the application are instrumented without recompiling the application. Reducing the number of recompilations directly reduces usage of computing resources such as processing cycles, memory, and storage. Reducing the number of recompilations also indirectly optimizes computing resource usage by enabling developers to quickly adjust which sections of code are instrumented, enabling developers to identify and fix more performance problems than with traditional approaches. Fixing these performance problems also results in improved application responsiveness and throughput.

One technological challenge to diagnosing performance problems is determining which sections of code to instrument. For example, developers will often fail to instrument potentially long-running sections of code. These sections are discovered only after telemetry analysis from a production deployment yields insufficient information to determine which specific lines of code are contributing to excessive latencies. One technical effect of the disclosed embodiments is to enable developers to quickly adjust which sections of code are instrumented based on data generated by a previous instrumentation.

Developers may also over-instrument their code by adding logging statements in sections of code that are executed many times per second (so-called "tight loops"). In either circumstance, the developer is only aware of the need to adjust which sections of code are instrumented after the application has been compiled and deployed. One technical effect of the disclosed embodiments automatically identifies and removes instrumentation of a "tight loop" that itself causes a performance problem.

Another technical challenge related to performance profiling is that the discipline of software engineering is predicated upon code modularity and software library reuse. A developer may issue function calls to a software library that itself exhibits a performance issue. Wrapping sections of source code in logging statements does not work when a library is not built from source. One technical effect of the disclosed embodiments is to enable instrumentation of any executable code, including third party libraries not built from source.

Various examples, scenarios, and aspects that enable automatic performance telemetry are described below with reference to FIGS. 1-15.

FIG. 1 illustrates an example of a traditional approach to manual code instrumentation. If a software application exhibits a performance problem, a developer may manually add instrumentation statements throughout the application's source code. After recompiling and redeploying the application, these statements will cause elapsed execution times to be emitted to a performance log for further evaluation. Adjusting which sections of code are measured requires manually editing the source code to add and remove the instrumentation statements.

As illustrated, un-instrumented code 102 lists the source code of a function named 'Tokenize'. In response to a performance problem, a developer may manually instrument 'Tokenize' by adding instrumentation statements 106 and 108, as depicted in manually instrumented code listing 104. In this example, timer initialization statements 106 declare a stopwatch variable and initialize it to the current system time. Log elapsed time statements 108A and 108B retrieve an elapsed time from the stopwatch variable, emitting the elapsed time to a log file for further investigation. As discussed above, manually instrumenting an application by inserting source code statements has many downsides, including the need to recompile and redeploy the application before the instrumentation takes effect, the inability to instrument modules that are not built from source, etc.

FIG. 2 illustrates a block diagram 200 illustrating aspects of an approach for automatic performance telemetry. In some configurations, un-instrumented source code 102 is compiled by compiler 204 into compiled application 206 (also referred to as 'application 206'). Compiled application 206 contains executable instructions 208 that are executed by virtual machine 214. Executable instructions 208 may be part of a target function 210. Executable instructions 208 are intermediate language executable code (IL) instructions, such as Common Intermediate Language instructions that are executed by the Microsoft® .NET runtime. Other types of IL and other virtual machines are similarly contemplated, such as Java® bytecode that executes on a Java Virtual Machine. In other configurations, un-instrumented source code 102 is interpreted by virtual machine 214 at runtime directly, without first being compiled into executable instructions 208. Examples of languages that are interpreted directly by a virtual machine include Python and JavaScript. IL may be compiled by runtime compiler 252 into processor-executable instructions. Runtime compiler 252 may also be referred to as JIT-compiler 252.

Profiler module 202 (also referred to as 'profiler 202') dynamically instruments application 206 without modifying un-instrumented source code 102 and without requiring recompilation or redeployment. Profiler 202 instruments application 206 by inserting executable instructions that measure elapsed execution time into target function 210 of application 206. The inserted executable instructions may also emit log entries 218 that contain elapsed execution times into log 216. As illustrated, profiler module 202 is provided as input to compiler 204 for inclusion in compiled application 206. However, profiler module 202 may also be deployed to a runtime environment separately from application 206.

In some configurations, managed assembly 260 of profiler module 202 executes in the same virtual machine 214 as application 206. This allows profiler 202 to access information that is only available within virtual machine 214. For example, virtual machine 214 may support a thread-local variable that stores different values depending on which thread of execution is accessing it. By executing within virtual machine 214, profiler 202 is able to retrieve values from the thread-local variable. If profiler 202 did not execute within virtual machine 214, this same data would be difficult if not impossible to retrieve.

Executing managed assembly 260 of profiler 202 within the same instance of virtual machine 214 as application 206 also enables application 206 to invoke functions exposed by profiler module 202. For example, profiler 202 may expose an initialization function 222 callable by application 206 to trigger the instrumentation process. Profiler 202 may also expose functions that allow application 206 to configure aspects of instrumentation that are not expected to change, such as the name of a root activity function 236. Profiler 202 may also expose functions that customize the format and content of data emitted into log 216. For example, profiler 202 may expose a SetActivityId function 224 that enables application 206 to save a custom identifier to a per-activity variable. When an instrumented function is executed, instrumented code added to target function 210 may invoke RetrieveActivityId function 226 to retrieve the custom identifier associated with the current activity. In some configurations, if it is not possible or practical to invoke managed code from instructions inserted by profiler 202, profiler 202 may instead invoke JIT-compiled RetrieveActivityId function 246 directly. Profiler 202 may then include the retrieved custom identifier in log entry 218 of log 216.

Profiler 202 may also include an unmanaged component 262, implemented in native code. Unmanaged component 262 is described in detail below in conjunction with FIG. 3B.

Third party library 220 contains executable code that is invoked by compiled application 206. In some circumstances, a developer of compiled application 206 does not build third party library 210 from source code. This may be because the source code of third party library 210 is not released to the public, or because building third party library 210 is impractical. In either case, if third party library 210 is not built from source code, a developer will be unable to manually add source code that instruments it. However, as discussed in more detail below in conjunction with FIGS. 4A-4C, profiler 202 may dynamically instrument function 228 included in third party library 210 without access to source code.

Configuration file 212 contains options used to control the operation of profiler module 202. For example, configuration file 212 may contain a list of modules to instrument 230, a list of functions not to instrument, thresholds 232, a name of an interface used to determine if a function is asynchronous 234, a name of a root activity function 236, or the like. By changing the configuration file, different instances of application 206 may have different functions instrumented, different thresholds can be applied, etc. In some embodiments, configuration file 212 may be updated during execution of a single instance of application 206, causing profiler module 202 to dynamically adjust what functions it instruments. Configuration files are discussed in more detail below in conjunction with FIG. 14.

Figure 3A:
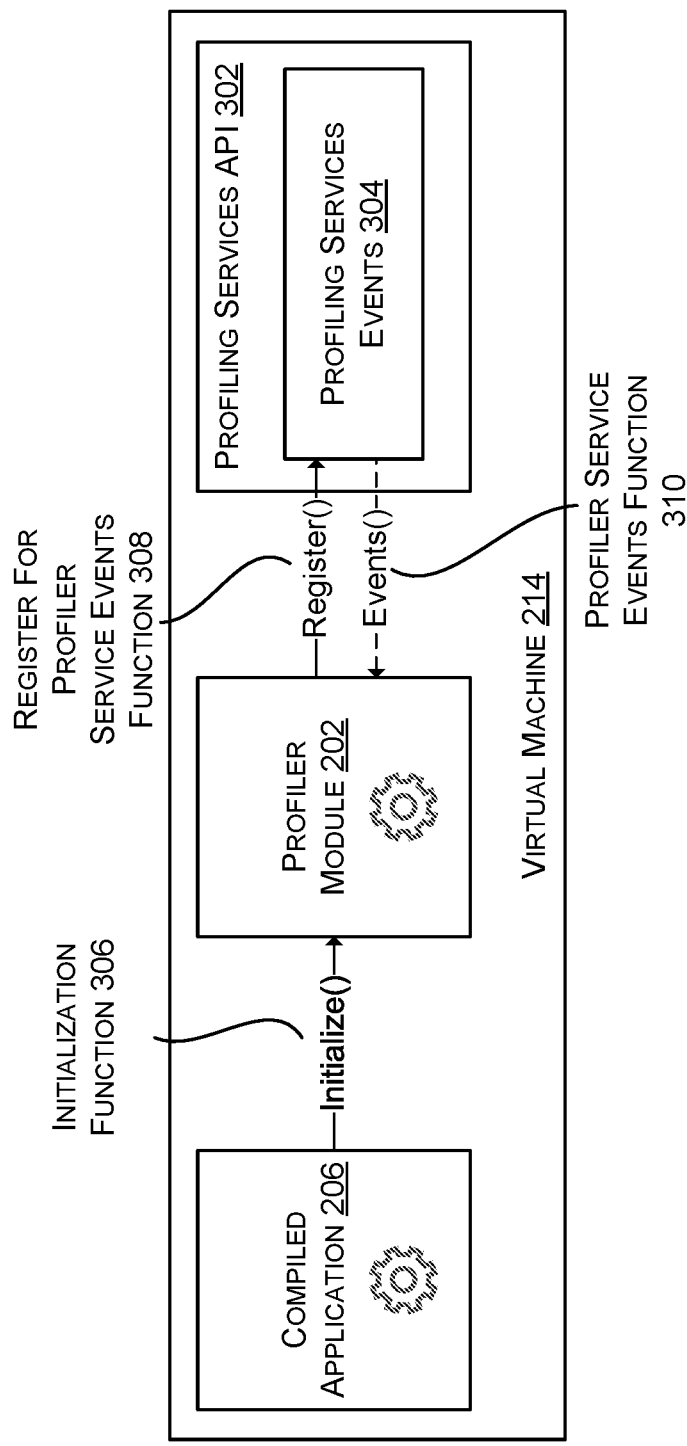
FIG. 3A illustrates a profiler module receiving events from a profiler services API within a virtual machine.

FIG. 3A illustrates application 206 invoking initialization function 306 on profiler module 202. Initialization function 306 may invoke RetrieveActivityId function 226, causing it to be JIT-compiled. The result of JIT-compiling RetrieveActivityId function 226 is the creation of JIT-compiled RetrieveActivityId function 246 in system memory. In a normal course of operation, managed code that invokes RetrieveActivityId function 226 via virtual machine 214 will have execution redirected to JIT-compiled RetrieveActivityId function 246.

FIG. 3A also illustrates profiler 202 receiving profiler service events 304 from profiling services API 302. In some embodiments, profiling services API 302 is implemented by virtual machine 214 to provide profilers and other developer tools with information about applications executed by virtual machine 214. For example, the Microsoft .NET runtime exposes the ICorProfiler API that enables developer tools to receive a notification when a class is loaded, a function is being JIT compiled, among other profiling services events 304. In order to receive these events 304, profiler 202 invokes a register for profiler service events function 308, after which profiling services API 302 may send events 304 to profiler 202 by invoking profiler service events function 310.

Profiler 202 utilizes initialization function 306 and profiler service events function 310 to enable JIT-compiled RetrieveActivityIds function 246 to be directly invoked as native code, bypassing an invocation from managed code. This enables RetrieveActivityIds function 226 to be invoked from instructions inserted into target function 210 without invoking managed code through virtual machine 214.

In some configurations, application 206 contains managed functions, such as target function 210, that execute within virtual machine 214. Managed functions are functions defined with IL that are JIT-compiled by virtual machine 214 into processor-native CPU instructions. Managed functions are typically JIT-compiled as needed, i.e. as they are invoked for the first time by another managed function via virtual machine 214.

At least some functions of profiler 202 execute within virtual machine 214. These managed functions enable access to data that is only available within virtual machine 214. For example, RetrieveActivityId function 226 may use managed code executing within virtual machine 214 to retrieve an activityId from an async-local variable.

However, the executable instructions inserted into target function 210 may not invoke RetrieveActivityId function 226 from managed code. In this case, RetrieveActivityId function 226 will not be automatically JIT-compiled. Instead, executable instructions inserted into target function 210 may directly invoke the JIT-compiled RetrieveActivityId function 246—the native code function generated by JIT-compiling RetrieveActivityId function 226. For example, a 'CALLI' instruction inserted into target function 210 may invoke JIT-compiled RetrieveActivityId function 246 directly, without using managed code, and without involving virtual machine 214. In other configurations, a 'CALLI' instruction inserted into target function 210 may invoke a native code function of profiler 202 that in turn directly invokes JIT-compiled RetrieveActivityId function 246.

Attempting to invoke JIT-compiled RetrieveActivityId function 246 directly presents at least two challenges. The first is how to cause RetrieveActivityId function 226 to be JIT-compiled, given that it is not invoked by managed code. In some configurations, initialization function 306 invokes RetrieveActivityId function 226 with dummy parameters, causing virtual machine 214 to JIT-compile RetrieveActivityId function 226 into JIT-compiled RetrieveActivityId function 246. As such, application 206 causes JIT-compiled RetrieveActivityId function 246 to be generated by invoking initialization function 306 of profiler 202.

The second challenge is determining the memory address of the JIT-compiled RetrieveActivityId function 246. Without this address, it would not be possible to directly invoke the JIT-compiled RetrieveActivityId function 246. In some configurations, profiler service events 304 include an event that indicates when a managed function was JIT-compiled. In addition to indicating that RetrieveActivityId function 226 has been JIT-compiled, this event may also indicate the address of the native code function it was JIT-compiled to—i.e. the address in memory of JIT-compiled RetrieveActivityId function 246. See JIT-compilation finished event 328, discussed below in conjunction with FIG. 3B.

Figure 3B:
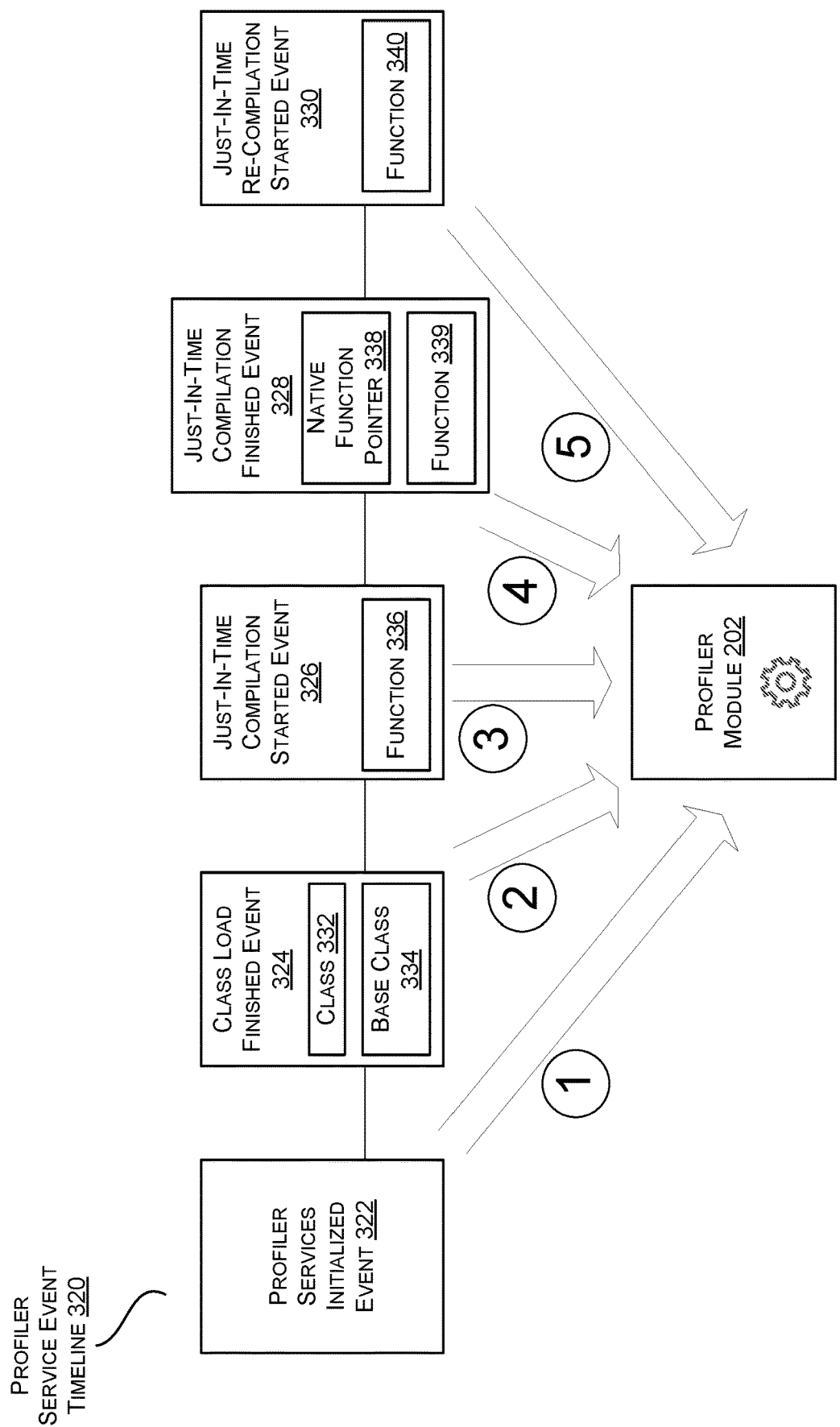
FIG. 3B illustrates a timeline of events received from the profiler services API shown in FIG. 3A.

FIG. 3B illustrates a timeline 320 of events 304 received from the profiler services API 302. The events depicted in FIG. 3B are not exhaustive or limiting, but are an example of a series of profiler services events 304 used by profiler 202 to automatically instrument application 206. As illustrated, profiler services initialized event 322 is received by profiler 202 first, enabling profiler 202 to subscribe to other events. For example, profiler 202 determines from configuration file 212 which functions of which modules to instrument, registering with profiler services API 302 to receive notifications related to these functions.

Class load finished event 324 may be used by profiler 202 to determine if a function is an asynchronous function implemented with a compiler-generated state machine. In some configurations, functions are determined to be asynchronous if they are members of a class that derives from an asynchronous state machine base class. In order to make this determination, class load finished events 324 are analyzed to determine if the class 332 that was loaded derives from a base class 334 that is an async state machine class. If a function is a member of such a class, then the function is determined to be asynchronous. What constitutes an async state machine base class may be different for different platforms. For the .NET runtime, one example is the IAsyncStateMachine class. In some configurations, the async state machine base class is identified by name. The name of the async state machine base class may be listed in configuration file 212. In some configurations, reflection is used to iterate over member variables of the base class to identify the state machine variable 1022. In some embodiments, the member variable is identified by name, e.g. by a name provided in configuration file 212. Once the member variable has been located, a slot on instances of the base class 334 is associated with the member variable, and instructions inserted into target function 210 to access the member variable may refer to the associated slot.

In some configurations, the base class associated with async functions does not include a state machine variable 1022. This may be because a different technique is used to track progress of an invocation of an asynchronous function across re-entrances. In these configurations, profiler 202 may modify a definition of the base class, or of class 332 itself, to add a member variable. This member variable may be used to store a reference to an entry of an associative data structure that stores a method entry timestamp and a state machine value 1024.

Just-in-time (JIT) compilation started event 326 is received by profiler 202 before a function is JIT compiled from IL to processor executable machine code. JIT compilation started event 326 includes function identifier 336, which identifies the function being JIT compiled. In response to JIT compilation started event 326, profiler 202 may determine if the identified function is a target function 210, and if so, analyze and rewrite the IL of the target function 210 to include instrumentation code. In some configurations, profiler 202 determines if function 336 is a target function by lookup into a list of target modules, a list of allowed functions, and/or a list of disallowed functions.

Just-in-time compilation finished event 328 is analyzed by profiler 202 to determine when a managed function 339 implemented by profiler module 202 has been JIT-compiled. For example, profiler 202 may monitor this event to determine when RetrieveActivityId function 226 has been JIT-compiled into JIT-compiled RetrieveActivityId function 246. Profiler 202 may also retrieve native function pointer 338, which points to the native function that resulted from JIT-compiling function 339.

In some configurations, profiler module 202 utilizes managed code functions to instrument target function 210, e.g. to retrieve values from per-activity variables stored in virtual machine 214. In some configurations, when rewriting the IL of target function 210, profiler module 202 inserts instructions to directly invoke a native code version of one of these managed functions, such as JIT-compiled RetrieveActivityIds function 246, even if the managed code function has not yet been JIT-compiled.

To prevent the inserted instructions from invoking a function that has not yet been JIT-compiled, profiler 202 may also insert instructions that first check whether the function implemented by profiler 202 has been JIT-compiled. In some configurations, these instructions check a global variable or other known location to determine if the managed function implemented by profiler 202 has been JIT-compiled. This global variable may be set when a JIT-compilation finished event 328 is received for the function. In some configurations, the global variable includes a copy of native function pointer 338, and the instructions that determine if the managed function implemented by profiler 202 has been JIT-compiled check to see if the global variable contains a NULL pointer or if it contains a valid function pointer.

Just-in-time re-compilation started event 330 is received by profiler 202 when a target function 210 is being re-compiled. Profiler 202 may trigger recompilation in order to update or remove instrumentation instructions from the target function 210.

FIG. 4A illustrates a listing of executable instructions of a function. In this example, the executable instructions are Common Intermediate Language (CIL) instructions that are executable on a Common Language Infrastructure (CLI) runtime, such as the Microsoft .NET runtime. Un-instrumented bytecode 402 illustrates a function generated by a language compiler, such as a C #compiler, that translates human-readable source code into stack-based virtual machine IL.

FIG. 4B illustrates a listing of executable instructions of the function shown in FIG. 4A after inserting instructions that store a timestamp in a local variable. Auto-instrumented bytecode 404A includes modified function 422, which has had additional local variable 406 and entry instructions 408 added to target function 404. In some configurations, local variable 406 is added to a function by modifying the signature 420 of the function 210. As illustrated, the local variable "entry_time", which has a type of int64, has been added to the function signature. This provides a location to store an initial timestamp retrieved from the system.

Auto-instrumented bytecode 404A also includes added entry instructions 408 that retrieve a current system time and store the resulting timestamp in the additional local variable 406. The instruction at address IL_0000, "ldc_i8 &MethodEnter", loads the address of the MethodEnter function implemented by profiler 202. The instruction at IL_0001, "calli (MethodEnterSig)" invokes the "MethodEnter" function at the loaded address. The "MethodEnter" function may be a function implemented by profiler 202 that returns a timestamp of a current system time. In other circumstances, the "calli (MethodEnterSig)" instruction may call into an operating system or runtime function that returns the current system time. By invoking the MethodEnter function by directly calling a function at a particular address in memory, any native function may be invoked from managed code, including a JIT-compiled native version of a managed function. As is true of all function, class, and variable names referenced throughout this document, the name "MethodEnter" is an example meant to be descriptive, but which is not limiting.

In some configurations, the "MethodEnter" function may be managed—i.e. consisting of IL that is JIT compiled by virtual machine 214. In this case, the managed "MethodEnter" function is invoked with a 'call' instruction that causes virtual machine 214 to JIT-compile the "MethodEnter" function, if necessary, before executing it.

The last inserted instruction at address IL_0002, "stloc entry_time," stores the timestamp returned by the "MethodEnter" function in the local variable named "entry_time". In this way, the timestamp is preserved until the target function returns, at which point an elapsed execution time may be computed.

FIG. 4C illustrates a listing of executable instructions of the function shown in FIG. 4A after inserting instructions that compute an elapsed execution time before return instruction 412 causes the target function 210 to return. Added exit instructions 410A and 410B invoke a "MethodExit" function implemented by profiler 202, passing in the value stored in the "entry_time" local variable. Added exit instructions 410A and 410B are inserted before every return (e.g. 'ret') instruction found within the target function. In addition to return instructions, any instruction that shifts execution to a different function is similarly identified and preceded with a call to MethodExit. For example, exceptions, co-routine return instructions (e.g. 'yield' instructions), and any other control flow instruction that causes execution to leave the target function is similarly prepended with a call to "MethodExit". As discussed above in conjunction with FIG. 4B, the "MethodExit" function may be a native code function implemented by profiler 202 and invoked by a "calli" instruction. Similarly, "MethodExit" may be a managed function invokable via a "call" instruction, enabling virtual machine 214 to JIT-compile "MethodExit" before the first execution.

FIG. 5 illustrates native functions of profiler module 202 that are invoked by instructions inserted into target function 210. In some configurations, profiler 202 includes native executable code functions and managed executable code functions. While any type of executable code can be used to implement any of the functionality described herein, there are certain advantages to using native code and managed code for different purposes. As referred to herein, native executable code—or 'native code'—is a listing of processor-specific executable instructions that can be directly executed by central processing unit (CPU) hardware. In contrast, managed executable code—also referred to as managed code—is processor agnostic executable code that is just-in-time (JIT) compiled into processor-specific instructions before being executed.

In some configurations, native executable code has an advantage of being able to execute without virtual machine 214. Native executable code may also be preferable when consuming a native code API, such as profiling services API 302 exposed by virtual machine 214. One example of such an API is the ICorProfiler interface exposed by the .NET runtime. Native executable code may also offer higher throughput and lower latencies than managed code, as well as direct access to operating system APIs. For example, native executable code may more easily consume a tracing API implemented by an operating system.

Profiler 202 may contain managed code in order to utilize functionality provided by virtual machine 214. One example of this functionality is a data type that stores different values for different execution contexts. Ordinary variables store data in a defined location in memory, regardless of execution context. For example, an ordinary global variable or an ordinary variable stored in heap memory refers to a defined memory location that is accessible by any thread of execution at any time. If a first thread stores a value in a first ordinary variable, a second thread may retrieve that value, or overwrite it with a new value. However, per-execution context data types my maintain different values in different memory locations for different execution contexts.

One example of a per-execution context variable is a thread-local variable. Thread-local variables may have the same scope, accessibility, and other qualifiers of ordinary variables, but each thread of execution accesses a different location in memory. In C #, a thread-local integer 'x' may be declared as "ThreadLocal<int> x;" or "[ThreadStatic] int x;". The code used to access a thread-local variable is otherwise indistinguishable from code used to access an ordinary variable, except that each thread of execution will access a different memory address. Thread-local variables are often used by multi-threaded server applications to isolate data from different client requests. For example, a web server may respond to each web request on a different thread of execution. Data specific to each web request may be stored in thread-local variables, isolating responses from each other.

Another per-execution context data type provided by virtual machine 214 is the async-local data type. Async functions may be implemented with a state machine such that the async function is re-entered multiple times and a state machine variable tracks which block of code to execute next. Since the function is re-entered multiple times, a local variable comes into and goes out of scope for each re-entrance, and so a local variable does not maintain data across the entire invocation of the async function. Async-local data types address this problem by storing data on a per-async invocation basis, enabling a variable to maintain a value across multiple re-entrances of the async function, and to maintain a different value for each invocation of an asynchronous function. In C #, async-local variables are declared as "AsyncLocal<int> x;"

Method enter function 502 illustrates pseudo-code of a function invoked by a call instruction that profiler 202 has added to target function 210. A "call" instruction refers to an instruction that transfers control to a different function, directly or indirectly, such as a "calli" instruction that transfers control directly to a native code function, a "jump" instruction that sets an instruction pointer without passing function parameters, a "call" instruction that is implemented by virtual machine 214 to ensure the target function has been JIT-compiled, and the like. In some configurations, profiler 202 inserts a call instruction into method enter function 502 at the beginning of target function 210. In this way, the timestamp records when the function is initially called, ensuring that most if not all of the elapsed execution time of target function 210 is measured. As illustrated, method enter 502 retrieves a system time, returning the retrieved value to the instructions that were inserted into target function 210. As depicted in FIG. 4A, target function 210 stores the retrieved timestamp in a local variable for future reference when computing an elapsed execution time.

Method exit function 504 lists pseudo-code of a function invoked by a call instruction inserted into target function 210. In some configurations, method exit function 504 is a native code function. Method exit function 504 may have to be implemented as a native code function due to limitations of virtual machine 214. However, as discussed above, it is often beneficial for profiler 202 to invoke managed code to retrieve data from virtual machine 214. In some embodiments, the native method exit function 504 invokes a JIT-compiled version of a managed code function, avoiding having to invoke a managed code function via virtual machine 214. As illustrated, method exit function 504 invokes a JIT-compiled version of the "RetrieveActivityIds" function 246, discussed below in conjunction with FIG. 6 Directly invoking the JIT-compiled version of the managed code function in this way avoids any limitations to invoking managed code from instrumented code. At the same time, the JIT-compiled version of the managed code function is still able to retrieve data maintained by virtual machine 214. For example, the JIT-compiled native code version of RetrieveActivityIds 246 may be invoked to retrieve activityIds from a per-activity variable stored by virtual machine 214. Examples of activities performed by application 206 include responding to a web request, a database request, a user interface operation, or the like. In some instances, per-activity variables retrieve different values for different activities based on which thread of execution is retrieving the value—i.e. based on an activity that the current thread of execution is associated with.

Before directly calling a JIT-compiled native code version of a managed code function, some embodiments first check whether the managed code function has actually been JIT compiled. This is necessary because bypassing virtual machine 214 to directly invoke the JIT-compiled version of the managed code function also bypasses how virtual machine 214 ensures that the managed function has been JIT-compiled. To this end, profiler 202 also monitors just-in-time compilation finished events 328 to determine when the managed code function invoked by method exit 504 has been JIT compiled.

As illustrated, method exit function 504 checks the "RetrieveActivityIdsHasBeenJITCompiled" global variable to determine if the "RetrieveActivityIds" managed code function has actually been JIT-compiled. "RetrieveActivityIdsHasBeenJITCompiled" may be set to 'true' in response to receiving a Just-In-Time compilation finished event 328 for "RetrieveActivityIds". The Just-In-Time compilation finished event 328 may also include the native function pointer 338 of the JIT-compiled version of "RetrieveActivityIds". The native function pointer 338 of the JIT-compiled version of "RetrieveActivityIds" may be stored so that it may be invoked directly by method exit function 504, e.g. by the "InvokeRetrieveActivityIdsNativeFunction" function.

Method exit continuation function 506 lists pseudo-code illustrating how an elapsed execution time is computed. Method exit continuation function 506 also illustrates how the elapsed execution time may be emitted to a trace log 216, including activityIds retrieved by the JIT-compiled version of the "RetrieveActivityIds" managed function. In some configurations, method exit continuation function 506 is invoked by the JIT-compiled version of "RetrieveActivityIds". In other configurations, instead of invoking method exit continuation function 506, the JIT-compiled version of "RetrieveActivityIds" returns the retrieved activityIds to the method exit function 504, which turn implements the functionality illustrated in method exit continuation function 506.

Activity root method entry function 508 illustrates a function invoked by a call instruction added by profiler 202 to an activity root function. Activity root functions are discussed in more detail below in conjunction with FIG. 9. Briefly, an activity root function is a function that is executed once for each activity. In many cases, an activity root function is executed at or near the beginning of the activity. For example, an IISHttpContext::Execute function may be executed once when responding to a web request. Profiler 202 may observe JIT-compilation started events 326 to identify activity root functions. Well-known activity root functions may be hard-coded by profiler 202, or profiler may retrieve a list of one or more activity root functions from configuration file 212.

When profiler 202 receives a JIT-compilation started event 326 for an activity root function, profiler 202 may instrument the activity root function to generate an activityId. In this way, each time an activity is created, activity root method entry 508 is invoked to generate a corresponding activityId. The generated activityId may be stored in a per-activity variable. This enables any instance of a target function to determine which activityId, and therefore which activity, it is a part of. In some configurations, method exit continuation function 506 emits application-defined activityIds and auto-generated rootActivityIds.

In some configurations, rootActivityIds are generated and tracked in order to correlate log entries with an activity. Without rootActivityIds, log entries emitted before application 206 is able to set a custom activityId would not be associated with any activity. By emitting a unique rootActivityId with all log entries that are associated with an activity, a developer may utilize a log entry that includes both an activityId and a rootActivityId to determine which activityId is associated with a particular rootActivityId. Once this association has been made, the custom activityId of an activity may be associated with any log entry that contains the corresponding rootActivityId.

FIG. 6 illustrates a listing of functions written in managed code that associate activities with activityIds. Briefly, telemetry helper class 602 contains per-activity variables 604 and 606 that store application-defined activityIds and auto-generated rootActivityIds, respectively. SetActivityId Function 610 is invoked by application 206 to name an activity that application 206 is currently processing. SetRootActivityId function 612 may be invoked to set an activity Id associated with most if not all functions executed as part of an activity. RetrieveActivityIds function 608 is invoked by method exit 504 in order to access the activityIds stored in per-activity variables 604 and 606. Function 614 invokes the RetrieveActivityIds function 608 with dummy parameters, causing it to be JIT-compiled into native-code.

As discussed above in conjunction with FIG. 5, application 206 may assign meaningful activityIds to activities. For example, a web request may be received from a specific user at a specific time. It may be useful for developers reviewing log 216 if each log entry 218 associated with the web request contained this information. As such, application 206 may generate an activityId based on the username and the time when the request was received. Application 206 may then invoke the SetActivityId function 610 to associate the application-generated activityId with the web request. SetActivityId stores the application-generated activityId in a per-activity variable, such as a ThreadLocal or AsyncLocal variable. In this way, when a thread executing as part of an activity retrieves the value of per-activity variable 604, it retrieves the activity Id associated with that activity. An activityId derived from a username and a request time is illustrative—activityIds may be generated based on any type of information, or they may be randomly generated.

In some configurations, an activity performs operations before application 206 is able to invoke the SetActivityId function 610. For example, when a web request is processed, library code may begin responding to the web request before application 206 participates—and therefore before application 206 is able to set a custom activityId. In order to correlate all functions calls from the same activity, application 206 may identify a root activity function that is invoked when a new activity is created. When it is JIT-compiled, profiler 202 may instrument the root activity function, inserting instructions that generate an activityId and that call SetRootActivityId function 612 to associate it with the new activity. In this way, before application 206 can invoke SetActivityId function 610, profiler 202 is still able to emit the auto-generated activityId into entries 218 of log 216. After application 206 has invoked SetActivityId function 610, both the application-defined activityId 604 and the auto-generated activityId 606 may be emitted into entries 218 of log 216. This enables a developer to associate an application-defined activityId with an auto-generated activityId. Once this association has been made, the function invocations that occurred before calling SetActivityId, and which only emitted an auto-generated activityId, may be correlated with an application-generated activityId.

In some configurations, managed code functions are only JIT-compiled when they are invoked via virtual machine 214. For example, RetrieveActivityId function 608 is not invoked via virtual machine 214, and so there is no trigger to JIT compile it. Instead, as discussed above in conjunction with method exit function 504, a JIT-compiled version of RetrievedActivityId 608 is directly invoked via a function pointer. In order to trigger the JIT-compilation of RetrievedActivityId 608, Initialize function 614 invokes RetrievedActivityId 608 with dummy parameters, forcing it to be JIT-compiled. In some configurations, application 206 invokes Initialize function 614 as soon as it can, enabling instrumented functions to use virtual machine 214 to retrieve per-activity variables 604 and/or 606.

Figure 7:
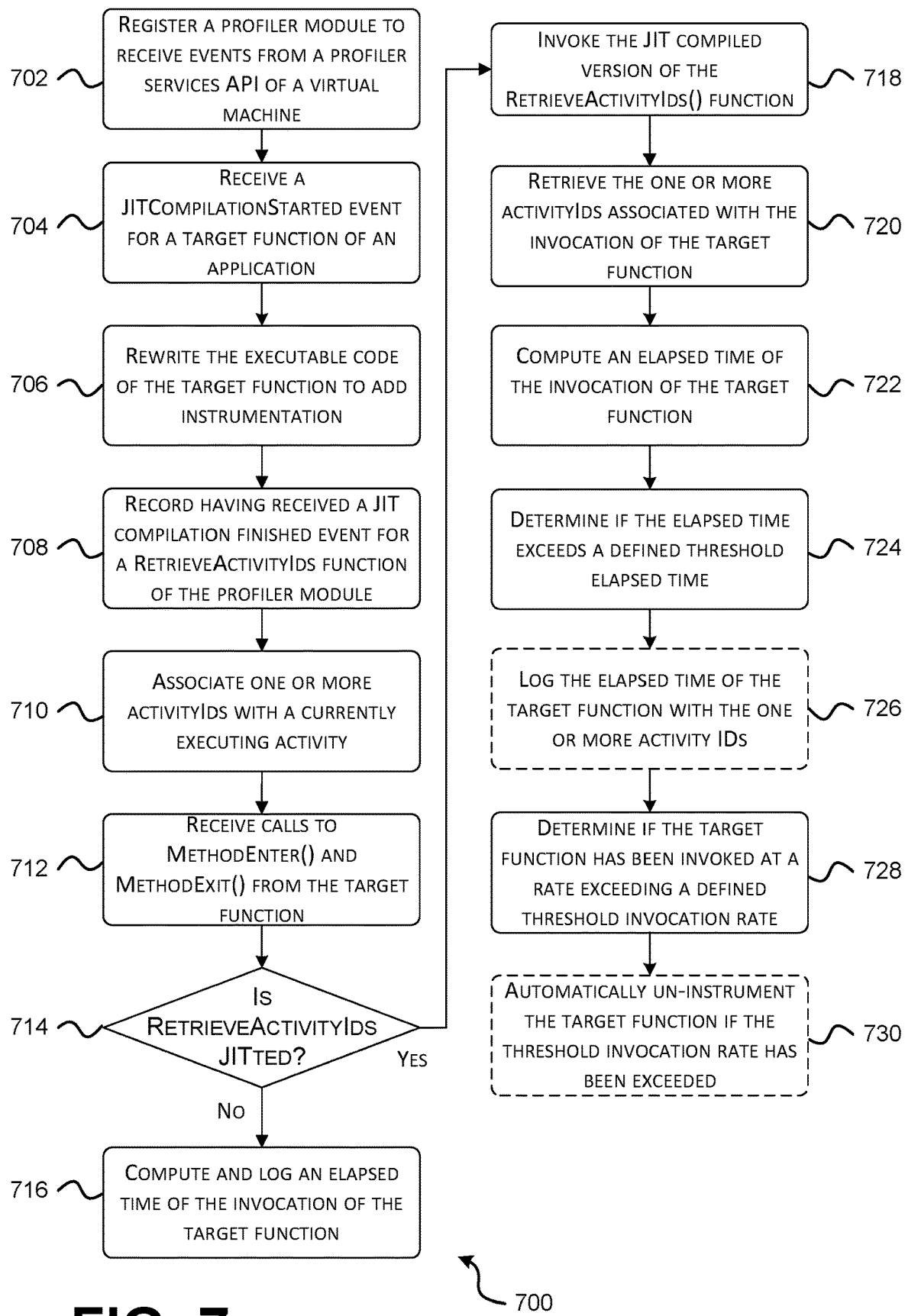
FIG. 7 is a flow diagram showing aspects of a routine for automatic performance telemetry.

Turning now to FIG. 7, aspects of a routine 700 for automatic performance telemetry are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 7, the routine 700 begins at operation 702 where profiler module 202 is registered to receive events 304 from profiler services API 302 of virtual machine 214. In some configurations, placing profiler module 202 and an application configuration file in a working directory of application 206 registers profiler 202 to receive events 304. In other configurations, a developer may register profiler 202 to receive events 304 by manually editing an application configuration file associated with application 206. For example, a developer may edit an application configuration file to add profiler 202 to a list of modules that implement profiler services API 302.

Proceeding to operation 704, profiler 202 receives a JITCompilationStarted event 326 for a target function 210 of application 206. JITCompilationStarted event 326 indicates that target function 210 is being invoked for the first time, providing an opportunity to rewrite the IL of target function 210 to add instrumentation instructions. As discussed in more detail in conjunction with FIGS. 4-5, profiler 202 may add executable instructions to the target function to record a method entry time and a method exit time of an invocation of target function 210.

At operation 706, profiler 202 analyzes and rewrites the IL of target function 210 to add instrumentation instructions. The target function 210 may have executable instructions inserted at the beginning of the function and before every return instruction. The inserted instructions may retrieve method entry and method exit timestamps and compute an elapsed execution time of target function 210.

Subsequently at operation 708, profiler 202 records having received a JIT Compilation Finished event 328 for a RetrieveActivityIds 226 implemented by profiler 202. JIT Compilation Finished event 328 may include a function identifier 339 of the function that was just JIT compiled, and a native function pointer 338 to the native function resulting from JIT-compilation.

Proceeding to operation 710, profiler 202 associates an activityId with a currently executing activity. In some configurations, profiler 202 associates an application-generated activityId with an activity being performed by a currently executing thread of execution. For example, profiler 202 may expose a function 610 that is invoked by application 206 to set the application-generated activityId. Profiler 202 may use a per-activity variable to store the application-generated activityId.

At operation 712, profiler 202 receives an invocation of method entry function 502 from instructions that were inserted into target function 210. Method entry function 502 captures a timestamp of a current system time, returning the result. Instructions inserted into target function 210 may store the result in a local variable added to target function 210.

Profiler 202 may also receive an invocation of method exit function 504. Method exit function 504 may have been invoked by instructions inserted into target function 210 prior to a return instruction. Method exit function 504 may compute an elapsed execution time, optionally retrieving one or more activityIds from per-activity variables 604 and 606 for inclusion in a log entry 218.

At operation 714, a determination is made whether the RetrieveActivityIds function 226 has been JIT-compiled. If not, execution continues to operation 716, where profiler 212 computes an elapsed execution time of the current invocation of target function 210.

However, if operation 714 determines that the RetrieveActivityIds function 226 has been JIT-compiled, then execution continues to operation 718, where profiler 202 invokes a JIT-compiled native code version of RetrieveActivityIds 246.

At operation 720, profiler 202 retrieves one or more activityIds associated with the current invocation of the target function 210. The retrieved activityIds may have been associated with the current activity by application 206 invoking a SetActivityId function 610. Additionally or alternatively, one of the retrieved activityIds may be auto-generated based on instrumenting a root activity function to auto-generate an activityId for each new activity created by application 206.

At operation 722, profiler 202 computes an elapsed execution time of the target function 210 based on the entry time stored in the new local variable and an exit time retrieved before exiting target function 210.

At operation 724, profiler 202 determines if the elapsed execution time of the invocation of target function 210 exceeds a defined threshold. If so, profiler optionally performs operation 726, where profiler 202 emits a log entry 218 based on the target function and one or more activityIds.

In some configurations, method exit function 504 applies the elapsed time threshold. For example, if a threshold elapsed time is 1 millisecond, then any elapsed execution time less than 1 millisecond will not be emitted to log 216. In this way, log entries 218 with very short execution times do not pollute the log file, making it easier to identify and analyze which functions are consuming the greatest amount of computing resources. Limiting which function invocations have log entries emitted also improves performance, as emitting a significant number of log entries 218 may itself become a performance bottleneck. Elapsed time thresholds may be set in configuration file 212, and they may be set per module, per function, or based on any other criteria.

Finally, at operation 728, profiler 202 determines if the target function has been invoked at a rate exceeding a defined threshold invocation rate. In some configurations, this determination is made by an extended method exit function 504 which tracks how many invocations each function has received over a defined period of time.

For example, the extended method exit function 504 of profiler 202 may be configured to un-instrument a function if the function is invoked more than a defined number of times over a defined amount of time. For example, a configuration file may set the threshold at 100 invocations over 10,000 milliseconds. When rates of execution exceed the threshold, instrumentation itself may become a performance bottleneck.

Finally, at operation 730, profiler 202 automatically un-instruments target function 210. In some configurations, profiler 202 un-instruments a function by requesting that virtual machine 214 re-JIT the function. Profiler 202 may then receive a JIT-re-compilation started event 330 for the function 340, upon which profiler 202 may instrument target function 210 in a different way or remove all instrumentation code by reverting to the original IL.

Figure 8:
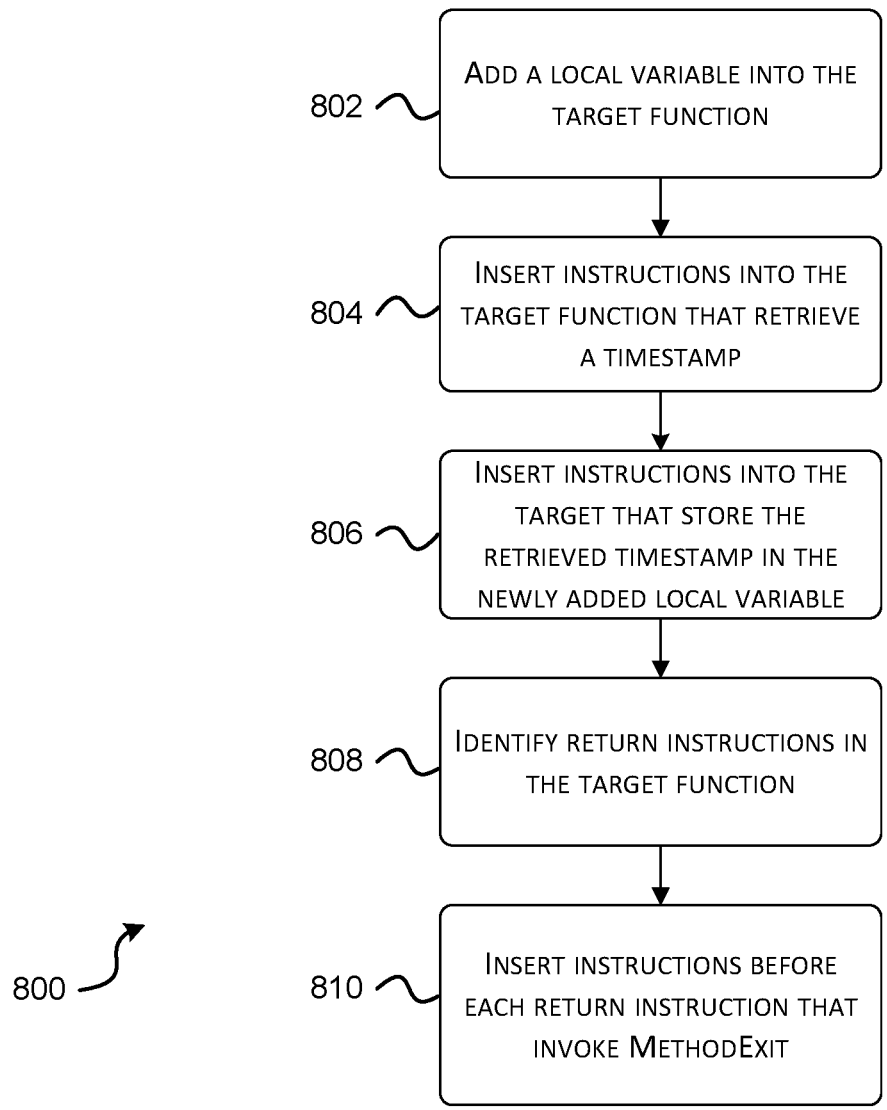
FIG. 8 is a flow diagram showing aspects of a routine for rewriting executable instructions of a target function to insert telemetry.

FIG. 8 is a flow diagram showing aspects of a routine 800 for rewriting executable instructions of a target function to insert telemetry. Routine 800 further defines operation 706 of FIG. 7.

With reference to FIG. 8, routine 800 begins at operation 802 where profiler 202 inserts a local variable into target function 210. In some configurations, the local variable is inserted by modifying a function signature of target function 210.

At operation 804, profiler 202 inserts instructions into target function 210 that retrieve a timestamp. The timestamp may represent a method entry time at which an invocation of target function began execution.

At operation 806, profiler 202 inserts instructions into target function 210 that store the retrieved timestamp in the newly added local variable. In this way, the method entry time is preserved for the duration of the invocation and can be used to compute an elapsed execution time of a function invocation.

At operation 808, profiler 202 identifies one or more return instructions in target function 210. Return instructions refer to any instruction that causes control of execution to transfer to a different function, e.g. a 'ret' instruction, throwing an exception, returning from a co-routine, or the like.

Finally, at operation 810, profiler 202 inserts executable instructions into target function 210 before each of the identified return instructions to invoke a method exit function 504. As such, before the target function 210 executes a return instruction, the method exit function 504 is invoked and computes an elapsed execution time. If thresholds and other conditions are met, method exit function 504 may also emit an entry 218 into a trace log 216.

Figure 9:
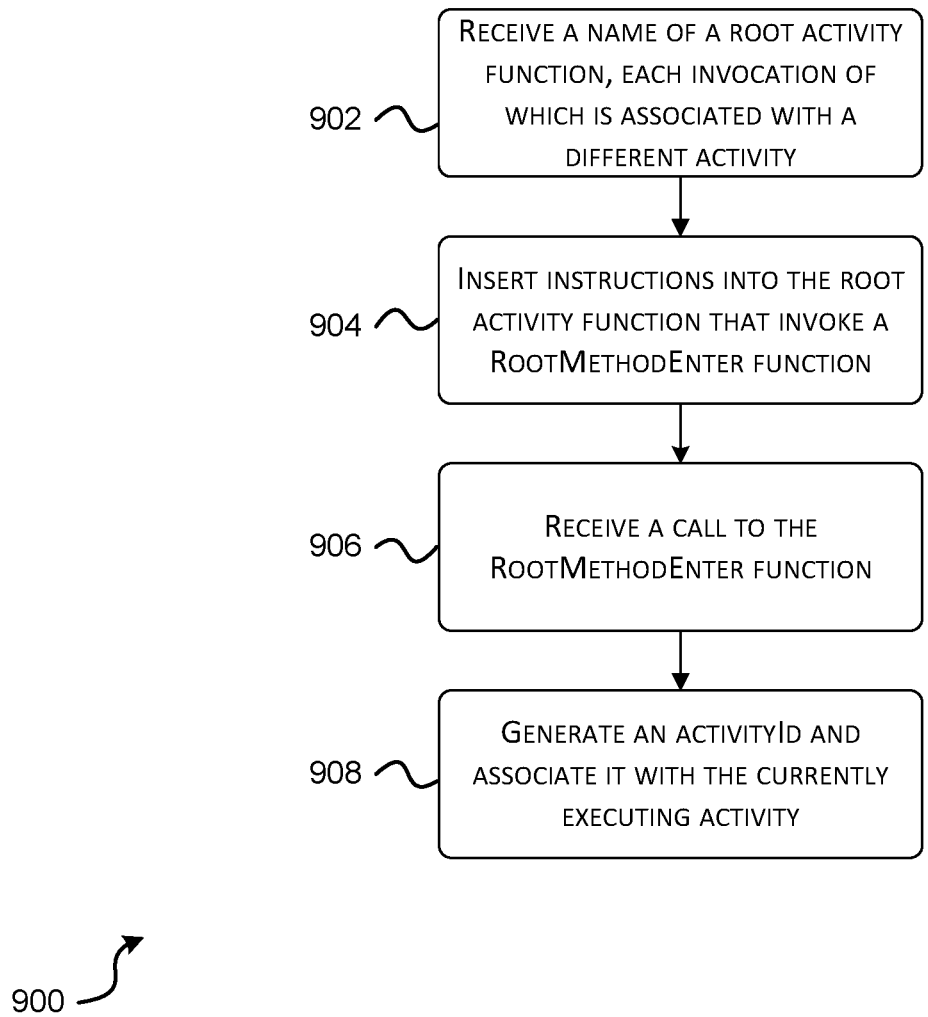
FIG. 9 is a flow diagram showing aspects of a routine for automatically generating an activity identifier.

FIG. 9 is a flow diagram showing aspects of a routine 900 for automatically generating an activity identifier. The activityIds generated by routine 900 may be used by operation 710 of FIG. 7.

With reference to FIG. 9, routine 900 begins at operation 902 where profiler 202 receives a name of a root activity function. In some configurations, the name of the root activity function is specified in configuration file 212.

At operation 904, profiler 202 inserts executable instructions into the root activity function that invoke a root method enter function 508. In some embodiments, the functionality performed by the root method enter function 508 is inserted directly into the root activity function. Profiler 202 may insert these executable instruction by intercepting a JIT-compilation started event 326 for the root activity function and inserting instructions similar to how profiler 202 rewrites executable instructions of target function 210.

At operation 906, profiler 202 receives an invocation of the root method enter function 508 from an invocation of the target function 210.

Finally, at operation 908, profiler 202 generates an activityId for the activity associated with the invocation of the root activity function. Profiler 202 then associates the generated activityId with the activity by invoking set root activityId function 612.

Figure 10A:
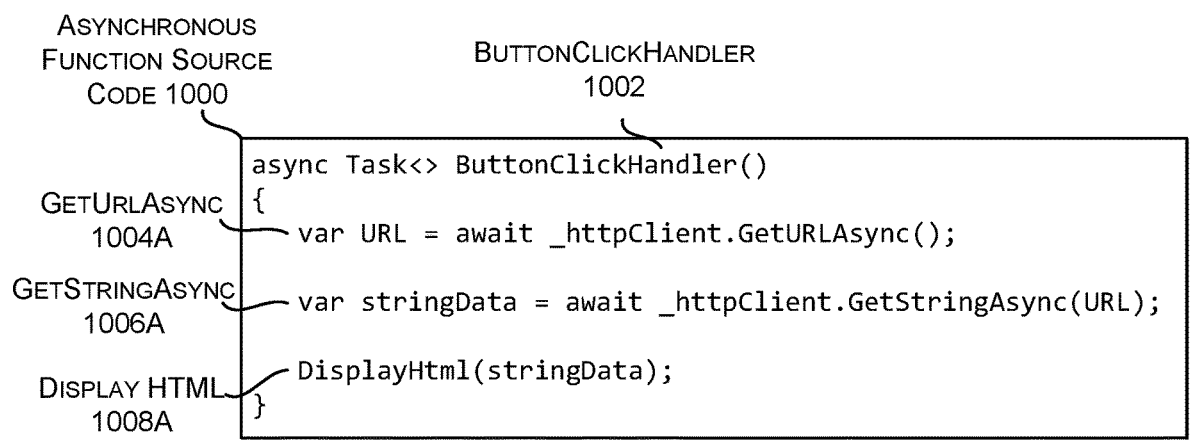
FIG. 10A illustrates a listing of an asynchronous function.

FIG. 10A illustrates a listing 1000 of an asynchronous function ButtonClickHandler 1002. ButtonClickHandler 1002 appears to execute code in a linear fashion on a single thread of execution. Specifically, ButtonClickHandler 1002 appears to retrieve a URL before retrieving and then displaying the contents of that URL as a string. As such, it appears that a local variable could be used to store a method entry time, and that an elapsed execution time may be computed by subtracting the method entry time stored in the local variable from a method exit time.

However, ButtonClickHandler 1002 is an asynchronous function that is re-entered multiple times to complete a single invocation. Any values stored in local variables are lost between re-entrances, and so a method entry timestamp stored in a local variable during an initial entrance will be unavailable during a final re-entrance. As such, an elapsed execution time of a single invocation of ButtonClickHandler 1002 cannot be computed based on a local variable.

In some configurations, an asynchronous function like ButtonClickHandler 1002 is compiled from source code into multiple synchronous code sections. Some of these synchronous code sections end with a suspend point. When execution reaches a suspend point, execution of the asynchronous function is suspended, and an asynchronous sub-function such as "GetURLAsync( )" is invoked, possibly executing on a different thread. A compiler-generated state machine variable stores a value indicating where execution of the asynchronous function will resume when the sub-function has completed—i.e. which of the multiple synchronous code sections will be executed next once the sub-function has completed. The suspended asynchronous function then returns to its caller, allowing the currently executing thread to be put to productive use while the sub-function executes on a different thread.

In some configurations, the compiler places the multiple synchronous code sections into a single function, referred to herein as a 'MoveNext' function by convention. The multiple synchronous code sections are interleaved with instructions that jump to the section associated with the current value of the state machine variable. When an asynchronous function is invoked, a state machine variable is associated with the invocation and assigned a default value. Then, the MoveNext function associated with the asynchronous function is entered for the first time. When a suspend point is reached, that invocation's state machine variable is updated, an asynchronous sub-function is invoked, and the MoveNext function returns. When the asynchronous sub-function completes, MoveNext is 're-entered', i.e. MoveNext is called again to continue where it left off. Execution will resume at a section of code associated with the current value of the state machine variable.

Throughout this document, an asynchronous function refers to a function defined in source code, while a MoveNext function refers to a compiler-generated function that implements an associated asynchronous function. When application 206 comprises IL, the MoveNext function is defined in IL. If application 206 is interpreted, then the MoveNext function may also be interpreted. An asynchronous function may be called by a source code statement, e.g. "await ButtonClickHandler( );". MoveNext functions are not explicitly referenced by source code, but are called by compiler-generated instructions.

Throughout this document, an invocation of an asynchronous function refers to a call to the asynchronous function as it is defined in source code. Each invocation of the asynchronous function is associated with a state machine variable 1022 that tracks the progress of execution across multiple calls to the associated MoveNext function. An entrance of an asynchronous function refers to an initial call to the MoveNext function. A re-entrance of an asynchronous function refers to a subsequent call to the MoveNext function. When re-entering an asynchronous function, the state machine variable 1022 determines where execution is to resume.

As illustrated, ButtonClickHandler 1002 invokes GetUrlAsync 1004A asynchronously. ButtonClickHandler 1002 will be suspended until GetUrlAsync 1004A returns—i.e. the thread executing ButtonClickHandler 1002 will return and execution of ButtonClickHandler 1002 will resume when GetUrlAsync 1004A has completed. Once ButtonClickHandler 1002 is resumed, GetStringAsync 1006A will be invoked, and ButtonClickHandler 1002 will be suspended again until it completes. When ButtonClickHandler 1002 is resumed for the last time, DisplayHTML function 1008A will by synchronously invoked, and ButtonClickHandler 1002 returns.

Instrumenting ButtonClickHandler 1002 as discussed above in conjunction with FIG. 7 will cause the execution time of each entrance into ButtonClickHandler's MoveNext function to be emitted. While this may be useful, it does not capture the time elapsed while GetUrlAsync 1004A or GetStringAsync 1006A are executing, nor does it provide an end-to-end elapsed execution time from the initial entrance of ButtonClickHandler 1002 until the final return.

Figure 10B:
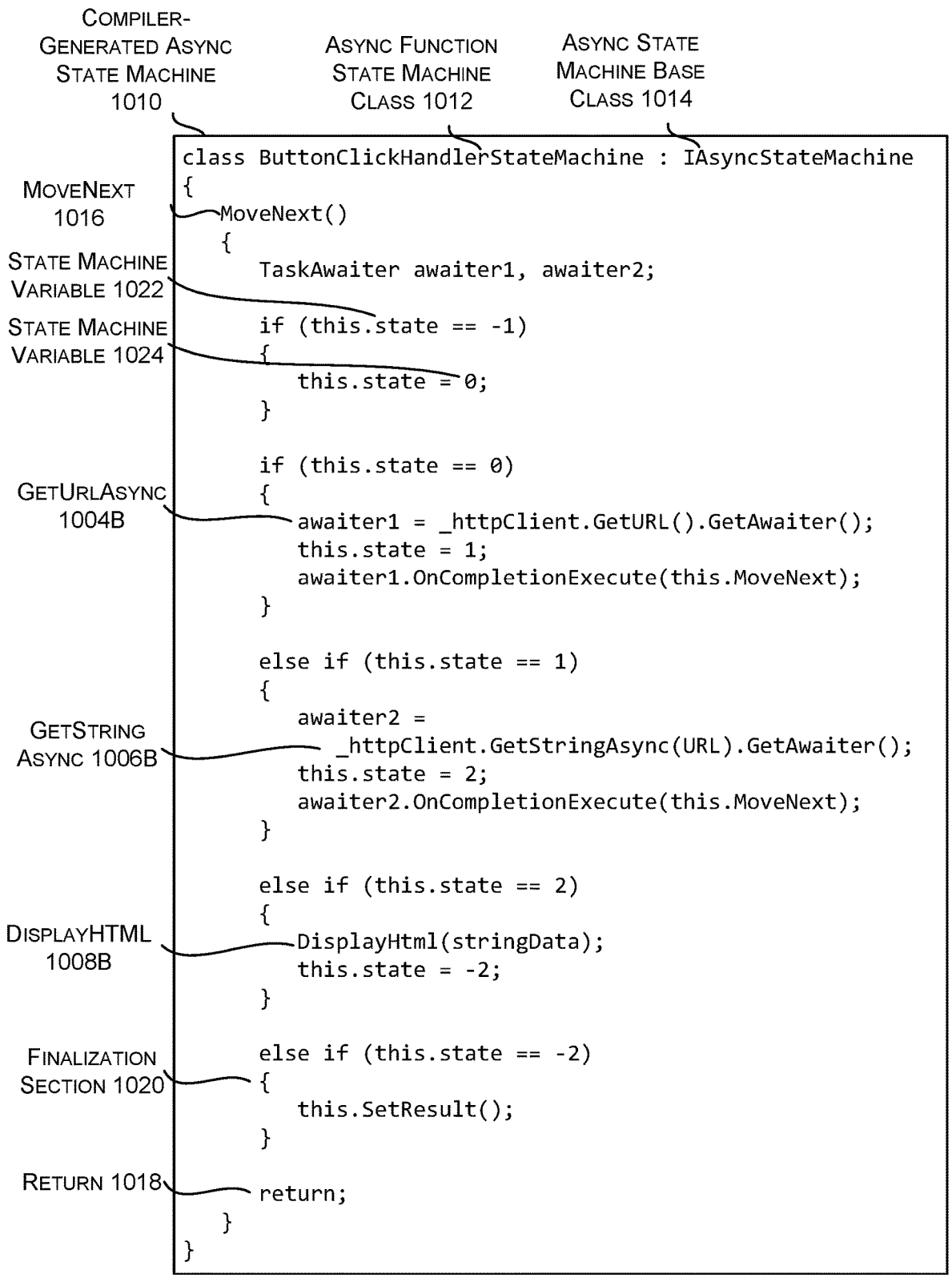
FIG. 10B illustrates a listing of a compiler-generated state machine that implements the asynchronous function shown in FIG. 10A.

FIG. 10B illustrates a listing of a compiler-generated state machine 1010 that implements the asynchronous function 1002 shown in FIG. 10A. The compiler has generated an async function state machine class 1012 named ButtonClickHandlerStateMachine. In some configurations, this compiler-generated class inherits from async state machine base class 1014, which provides state machine variable 1022.

In some configurations, the logic expressed in ButtonClickHandler 1002 is translated into the MoveNext function 1016. MoveNext function 1016 breaks execution of ButtonClickHandler 1002 into synchronous code sections, where each section is associated with a different value of state machine variable 1022. As illustrated, state machine variable 1022 is initialized to −1, which is the value when MoveNext 1016 is initially invoked. As such, the first entrance of MoveNext 1016 invokes initialization section 1018. Upon completion of initialization section 1018, the state machine variable 1022 may be assigned a value of '0', which is by convention associated with a first section of ButtonClickHandler 1002.

Execution of the first entrance continues to GetUrlAsync 1004B, where GetURL is executed asynchronously. GetUrlAsync 1004B is one example of invoking an asynchronous function, advancing the value of state machine variable 1022, and registering to resume execution of MoveNext

1016 when the async operation is completed. Upon completion of GetUrlAsync 1004B, execution falls through to the return instruction 1018.

MoveNext 1016 may be re-entered upon completion of GetUrlAsync 1004B. With a value of 1, state machine variable 1022 will cause the GetStringAsync 1006B section of MoveNext 1016 to be executed. As illustrated, the GetStringAsync function is invoked on a different thread of execution, the value of state machine variable 1022 is advanced to 2, and MoveNext 1016 is registered to resume execution when GetStringAsync has completed execution. After the GetStringAsync 1006B section of MoveNext 1016 completes, execution falls through to return 1018.

MoveNext may then be re-entered again upon completion of GetStringAsync 1006B. With a value of 2, state machine variable 1022 will cause the DisplayHTML section 1008B to execute. This section does not invoke async code, and so after completion, the state machine variable will be set to -2, which by convention indicates that execution is complete but for FinalizationSection 1020. FinalizationSection 1020 will then be executed, setting the result of ButtonClickHandler 1002, and execution will fall through to Return 1018.

FIG. 11A illustrates a listing 1102 of the asynchronous function shown in FIG. 10A. In some configurations, state machine variable 1022 is repurposed to store an entry time 1106 in addition to storing the actual state machine value. In contrast to additional local variable 406, which does not persist between re-entrances of MoveNext 1016, state machine variable 1022 may be a member variable, a heap variable, or a global variable, and as such has a lifetime that spans multiple re-entrances of MoveNext 1016. For example, state machine variable 102 may be a member variable of IAsycStateMachine 1014, and as such is scoped to a single invocation of ButtonClickHandler 1002.

In some configurations, state machine variable 1022 is repurposed to store a key to a state map 1110. State map 1110 maintains a true state machine value and a method entry timestamp for each invocation of an asynchronous function instrumented by profiler 202. For example, each entry in state map 1110 may include a state machine value field that stores the actual state machine value and a method entry timestamp field that stores the time when the invocation began. By storing the key in state machine variable 1022, the method entry timestamp may be retrieved at any point during the invocation—i.e. any re-entrance of MoveNext 1016 may access the method entry timestamp.

As illustrated, initialization section 1018 has been rewritten to include instructions 1108 that store a system time in timestamp 1106. Instructions then store the timestamp 1106 and the true state machine value in a new entry of state map 1110. The "CreateStateTimeMapEntry" function creates a new entry in state map 1110. Within the new entry, the true state machine value is set to 0, and the method entry time is set to the value of timestamp 1106. The key of the newly created entry is then stored in state machine variable 1022. State map 1110 may be implemented as a hash table, a red-black tree, or any other associative data structure. FIG. 11A depicts the rewritten instructions in pseudo-code. However, this is for illustrative purposes. In practice, profiler 202 parses and rewrites IL.

In other embodiments, the entry time and the true state machine value are packed into state machine variable 1022 directly, without the use of a map or other data structure. For example, profiler 202 may emit instructions that store the state machine value in the lower half of state machine variable 1022 and the timestamp in the upper half of state machine variable 1022.

FIG. 11B illustrates a listing of the asynchronous function shown in FIG. 10A after replacing instructions that access the state machine variable 1022 with instructions that access a state machine value stored in the state map 1110. In order for ButtonClickHandler 1002 to be processed as an asynchronous function that utilizes a compiler generated state machine to track progress across multiple re-entrances, profiler 202 identifies and replaces instructions that access state machine variable 1022, which has been repurposed to store a key to state map 1110, with instructions that access the true state machine value stored in state map 1110. In this way, both loads and stores of state machine variable 1022 are replaced with instructions that load/store state machine values from the entry in state map 1110 associated with the key stored in state machine variable 1022. In this way, ButtonClickHandler 1002 may utilize the same state machine infrastructure to execute asynchronously while additionally supporting the ability to save a method entry timestamp across re-entrances.

As illustrated, replacement load instructions 1112 depict pseudo-code of instructions profiler 202 may generate to load a state machine value from an entry of state map 1110. These instructions replace instructions from the original version of ButtonClickHandler 1002, which load a state machine value from state machine variable 1022 directly. Specifically, "g_STMap[this.state].state" is an expression that loads a true state machine value associated with the current invocation of ButtonClickHandler 1002. The "g_STMap[this.state]" portion of the expression retrieves the entry in state map 1110 ("g_STMap") associated with the key stored in state machine variable 1022 ("this.state"). The "state" field of the resulting entry contains the true state machine value. Since replacement load instructions 1112 are used in the context of a comparison—i.e. the resulting state machine value is compared for equality with zero—profiler 202 also inserts instructions to load the state machine value. The pseudo code of replacement store instructions 1114 is similar, except that the instructions that replace a store instruction of state machine variable 1022 must store a value in the corresponding "state" field.

FIG. 11C illustrates a listing of the asynchronous function shown in FIG. 10A after inserting instructions that compute an elapsed execution time. In some configurations, an elapsed execution time is computed for each re-entrance. The elapsed execution time of the final re-entrance indicates a total execution time of an invocation of ButtonClickHandler 1002.

In some configurations, computation of elapsed time expression 1116 is pseudo-code of instructions added by profiler 202 to compute an amount of time that has elapsed since the current invocation of ButtonClickHandler 1002 began. As illustrated, "GET_ELAPSED_MILLISECONDS_FROM" is called with a timestamp retrieved from a timestamp field of an entry in the state map 1110. Specifically, the state machine variable 1022 (e.g. "this.state") is used as a key to retrieve an entry from state map 1110. From this entry, the "timestamp" field is accessed, retrieving the timestamp that was stored in state map 1110 by the call to "CreateStateTimeMapEntry". This timestamp, which represents a method entry time, is used by "GET_ELAPSED_MILLISECONDS_FROM" to compute an elapsed execution time. "GET_ELAPSED_MILLISECONDS_FROM" may internally call "RetrieveSystemTime" to obtain a method exit timestamp. Emit elapsed execution time expression 1118 is pseudo-code representing instructions inserted by profiler 202 into ButtonClickHandler 1002 that generates a log entry 218. As illustrated, the generated log entry includes an elapsed time, a name of the asynchronous function 210 that MoveNext helps to implement, and the current state machine value ("g_STMap[this.state].state").

Figure 12:
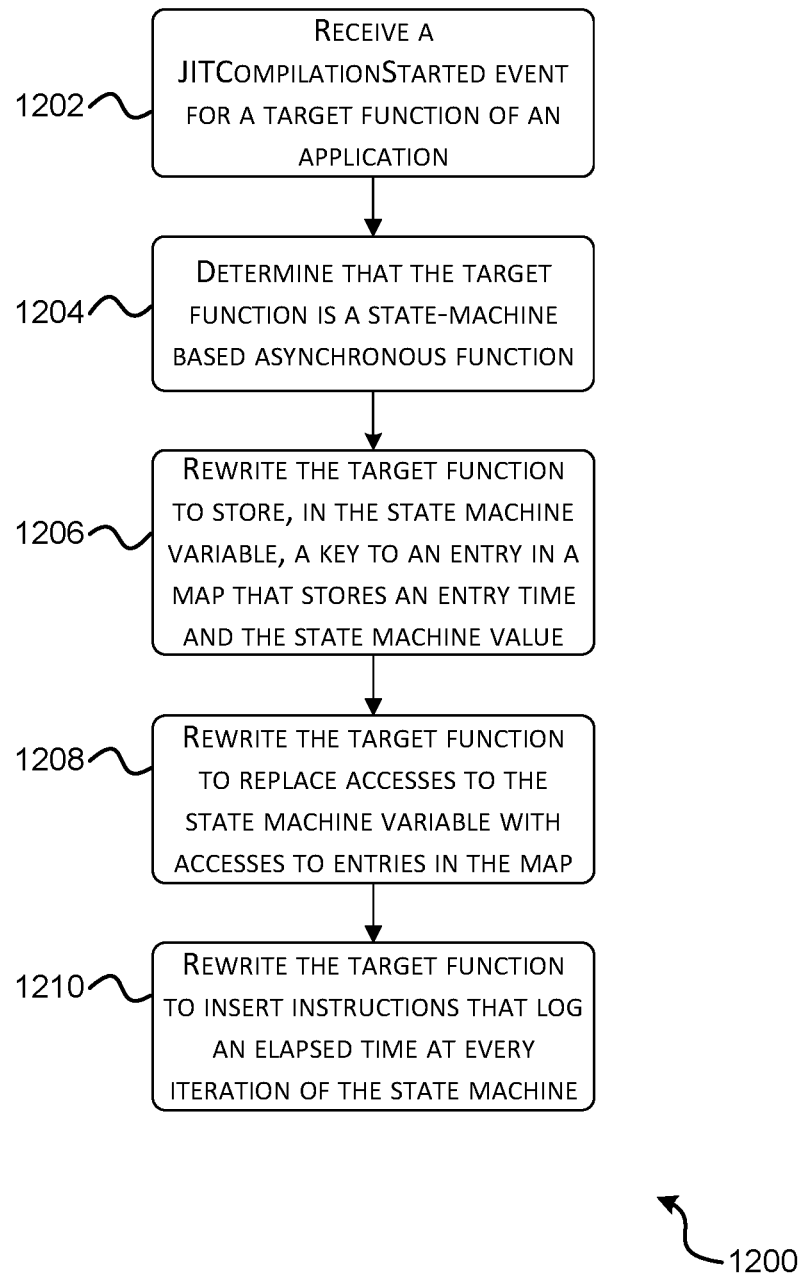
FIG. 12 is a flow diagram showing aspects of a routine for automatic performance telemetry of an asynchronous function.

FIG. 12 is a flow diagram showing aspects of a routine 1200 for automatic performance telemetry of an asynchronous function.

At operation 1202, profiler 202 receives a JITCompilationStarted event 326 for a target function 210 of application 206. In response to this event, profiler 202 has the opportunity to analyze and re-write the IL of the target function 210 that is about to be JIT-compiled.

At operation 1204, profiler 202 determines that the target function 210 is a state-machine based asynchronous function. In some configurations, profiler 202 does this by determining that a class that the target function 210 is a member of derives from a base class common to all async functions.

At operation 1206, profiler 202 rewrites the IL of the target function 210 to store a method entry timestamp across re-entrances of the asynchronous target function 210. In some configurations, when the asynchronous target function 210 uses a state machine to track and manage execution progress through an asynchronous function, profiler 202 repurposes the state machine variable 1022 to additionally store a method entry timestamp of the initial entrance of an invocation of the asynchronous target function 210. In some configurations, profiler 202 repurposes the state machine variable 1022 to store a key to a state map that stores the method entry timestamp and the true state machine value.

At operation 1208, profiler 202 rewrites the IL of the target function 210 to replace accesses to the state machine variable 1022 with access to entries in the state map. Instructions that retrieve a value from the state machine variable 1022 are replaced with instructions that use the state machine variable 1022 as a key to the state map, and which retrieve the true state machine value from the entry in the state map that is associated with the key. Similarly, instructions that store a value in the state machine variable 1022 are replaced with instructions that use the state machine variable 1022 as a key to the state map, and which store a new state machine value in the entry of the state map that is associated with the key.

Finally, at operation 1210, profiler 202 rewrites the target function 210 to insert instructions that log an elapsed time at one or more re-entrances of the asynchronous target function 210.

FIG. 13 illustrates a listing of a configuration file 212 used to configure execution of profiler 202. In some configurations. Configuration file 212 may include a list of modules to instrument 1304. A module may refer to any component, shared object, dynamic link library, executable, or other file, stream, or collection of executable instructions. By default, inclusion of a module in this list causes all functions within that module to be instrumented. External libraries 1306 may also be a part of the list of modules to instrument 1304, e.g. runtime, operating system, third party, or any other type of module that is not build from source.

Configuration file 212 may also set default instrumentation thresholds and per-module instrumentation thresholds. For example, as illustrated, the module Microsoft.OData.Core.dll has an auto-uninstrument threshold 1308 that indicates an upper bound on how frequently an instrumented function may be invoked before it is auto-uninstrumented. As illustrated, a time threshold 1310 and an invocation count 1312 are listed. If an instrumented function is invoked more than the invocation count 1312 over a period of time defined by time threshold 1310, then profiler 202 may un-instrument the offending function. In other configurations, a threshold rate may be set above which instrumentation is paused for a defined period of time. In other configurations, a threshold rate may be set, above which instrumentation continues but logging is omitted or reduced.

Configuration file 212 may also include a list 1314 of functions to exclude from instrumentation. This list may be defined per module, or application wide. As illustrated, class and static constructors are excluded from instrumentation.

Configuration file 212 may also include an elapsed time above which an invocation should be logged 1316. For example, threshold 1316 may define a number of milliseconds below which logging as skipped, under the assumption that a quickly executing function is unlikely to be a root cause of a performance problem.

Configuration file 212 may also include a limit 1318 on the number of intermediate states of an asynchronous function to log. As discussed above in conjunction with FIG. 11, an asynchronous function may have an initial execution, followed by execution of one or more intermediate sections, followed by execution of a final section. By default, elapsed execution times from the initial entry time of an invocation as emitted for each re-entrance of the function. The limit 1318 may limit how many intermediate sections a log entry is generated for, while allowing the elapsed execution time to be emitted at the final section.

Configuration file 212 may also include a name 1320 of the async base class that, when found, identifies a member function as an asynchronous function. This value is unlikely to change unless configuration file 212 is ported for use on a different virtual machine 214.

Configuration file 212 may also include a name of a function 1322 called once per activity. This name determines the root method of an activity that may be instrumented to generate a per-activityId for each new activity.

FIG. 14 illustrates a listing of a log 1402 generated by the profiler module 202. Log 1402 include entries emitted by an instrumented version of ButtonClickHandler 1002, including entries emitted during an initial state 1404 generated during execution of Initialize State Map section 1104. The log entry during initial state 1404 indicates that the state machine variable 1022 has a value of 0—i.e. an initial value. Similarly, entries emitted during intermediate states 1406 are generated by emit elapsed execution time instructions 1118 when the state machine variable 1022 had values 1 or 2. And entries emitted during final state 1408 is also generated by emit elapsed execution time instructions 1118 but when the state machine variable 1022 has a value of −2.

Figure 15:
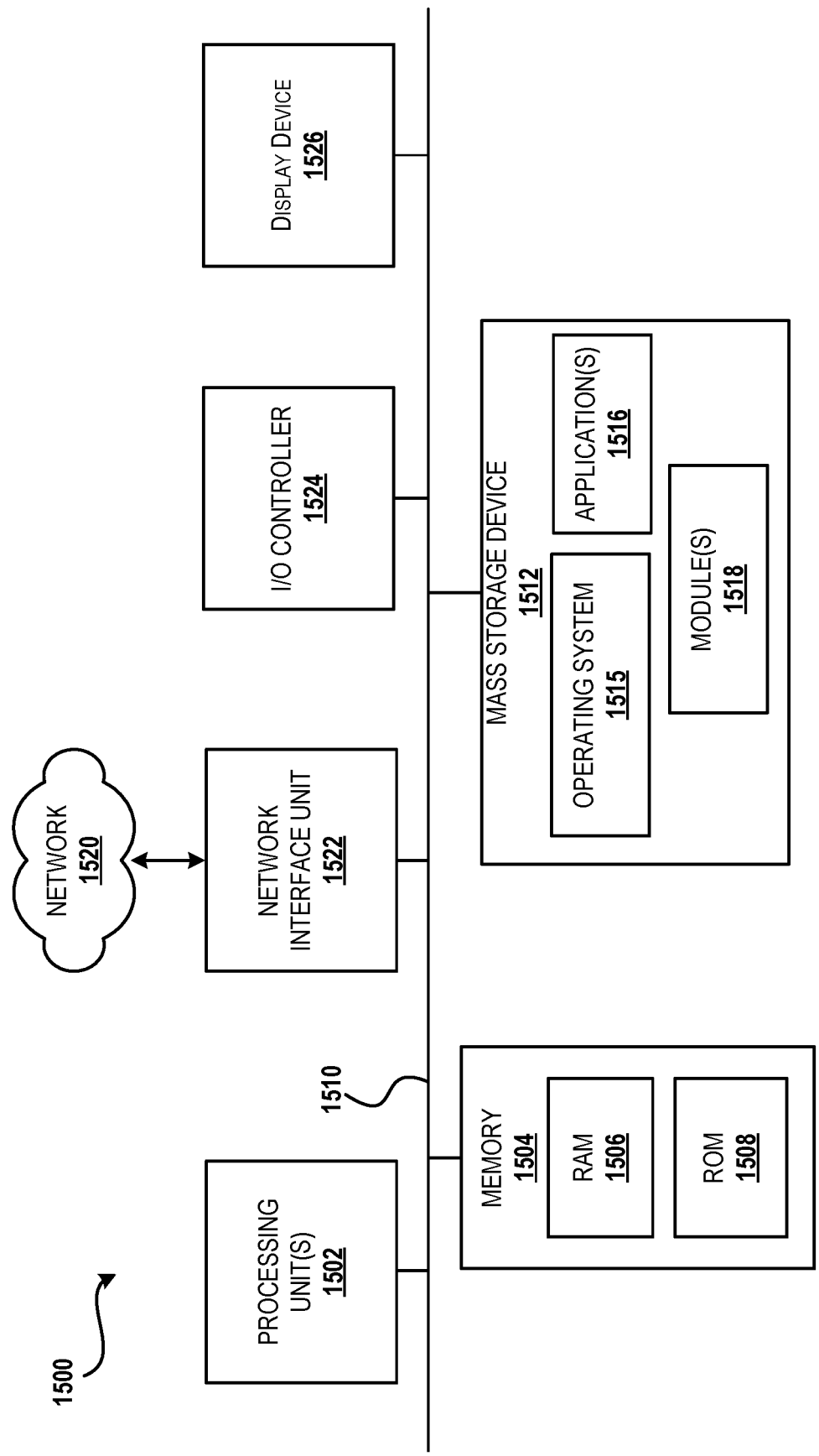
FIG. 15 is a computer architecture diagram illustrating an illustrative computer hardware and software architecture for a computing system capable of implementing aspects of the techniques and technologies presented herein.

FIG. 15 shows additional details of an example computer architecture 1500 for a computer capable of executing the program components described herein. Thus, the computer architecture 1500 illustrated in FIG. 15 illustrates an architecture for a server computer, a mobile phone, a PDA, a smart phone, a desktop computer, a netbook computer, a tablet computer, and/or a laptop computer. The computer architecture 1500 may be utilized to execute any aspects of the software components presented herein.

The computer architecture 1500 illustrated in FIG. 10 includes a central processing unit 1502 ("CPU"), a system memory 1504, including a random-access memory 1506 ("RAM") and a read-only memory ("ROM") 1508, and a system bus 1510 that couples the memory 1504 to the CPU 1502. A basic input/output system containing the basic routines that help to transfer information between elements within the computer architecture 1500, such as during startup, is stored in the ROM 1508. The computer architecture 1500 further includes a mass storage device 1512 for storing an operating system 1514, other data, one or more applications 1516, and one or more modules 1518 such as the profiler module 202.

The mass storage device 1512 is connected to the CPU 1502 through a mass storage controller (not shown) connected to the bus 1510. The mass storage device 1512 and its associated computer-readable media provide non-volatile storage for the computer architecture 1500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 1500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media or a computer storage medium may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 1500. For purposes of the claims, the phrase "non-transitory computer storage medium," "computer storage medium," "computer-readable storage medium" and variations thereof, does not include waves, signals, and/or other transitory and/or intangible communication media, per se.

According to various configurations, the computer architecture 1500 may operate in a networked environment using logical connections to remote computers through the network 1520 and/or another network (not shown). The computer architecture 1500 may connect to the network 1520 through a network interface unit 1522 connected to the bus 1510. It should be appreciated that the network interface unit 1522 also may be utilized to connect to other types of networks and remote computer systems. The computer architecture 1500 also may include an input/output controller 1524 for receiving and processing input from a number of other devices, including a keyboard, mouse, or electronic stylus (not shown in FIG. 15). Similarly, the input/output controller 1524 may provide output to a display screen, a printer, or other type of output device (also not shown in FIG. 15).

In various examples, the computer architecture 1500 can include a display device 1526 that is configured to present information in a visual form. In particular, the display device 1526 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display device 1526 is a liquid crystal display ("LCD") utilizing any active or passive matrix technology and any backlighting technology (if used). In some configurations, the display device 1526 is an organic light emitting diode ("OLED") display. Other display types are contemplated. The display device 1526 can also be a touchscreen configured to detect the presence and location of a touch. The display device 1526 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology.

It should be appreciated that the software components described herein may, when loaded into the processing unit 1502 and executed, transform the processing unit 1502 and the overall computer architecture 1500 from a general-purpose computing system into a special-purpose computing system customized to facilitate the functionality presented herein. The processing unit 1502 may be constructed from any number of transistors or other discrete circuit elements, which may individually or collectively assume any number of states. More specifically, the processing unit 1502 may operate as a finite-state machine, in response to executable instructions contained within the software modules disclosed herein. These computer-executable instructions may transform the processing unit 1502 by specifying how the processing unit 1502 transitions between states, thereby transforming the transistors or other discrete hardware elements constituting the processing unit 1502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1500 in order to store and execute the software components presented herein. It also should be appreciated that the computer architecture 1500 may include other types of computing devices, including hand-held computers, embedded computer systems, personal digital assistants, and other types of computing devices known to those skilled in the art. It is also contemplated that the computer architecture 1500 may not include all of the components shown in FIG. 15, may include other components that are not explicitly shown in FIG. 15, or may utilize an architecture completely different than that shown in FIG. 15.

The disclosure presented herein also encompasses the subject matter set forth in the following clauses.

Example Clause A, A computer-implemented method for automatic performance telemetry, comprising intercepting a runtime compilation of a function (210) into processor executable instructions; modifying the function (210) by: adding a local variable (406) to the function (210), inserting instructions (408) configured to retrieve a first current system time and store the first current system time in the local variable (406); identifying a return instruction (412) within the function (210); inserting, before the return instruction (412), instructions (410) configured to: retrieve a second current system time, compute an elapsed execution time by subtracting the first current system time stored in the local variable (406) from the second current system time, and output the elapsed execution time (726); and passing the modified function (210) to the compiler (252), causing the compiler (252) to translate the modified function (210) into processor executable instructions.

Example Clause B, the method of Example Clause A, wherein the function is part of an application, the method further comprising: receiving, from the application, an activity identifier associated with an activity being performed by the application; and wherein the instructions inserted before the return statement instruction of the function further include instructions configured to: retrieve an individual activity identifier of an individual activity associated with a current invocation of the function, wherein the individual activity identifier was received from the application, and output the individual activity identifier.

Example Clause C, the method of Example Clause A, wherein the function is part of an application, the method further comprising: receiving, from the application, a function identifier of a root function, wherein each invocation of the root function is associated with a different activity; intercepting a request to compile the root function to processor executable instructions; modifying the root function by inserting instructions configured to generate an activity identifier; passing the modified root function to the compiler, causing the compiler to translate the modified root function into processor executable instructions; and wherein the instructions inserted before the return instruction of the function further include instructions configured to: retrieve an individual activity identifier of an individual activity associated with a current invocation of the function, wherein the individual activity identifier was generated by the modified root function, and output the retrieved individual activity identifier.

Example Clause D, the method of Example Clause A, further comprising: receiving a threshold rate of execution; wherein the instructions inserted before the return instruction of the function further include instructions configured to: determine a rate at which the function has been invoked; determine that the rate at which the function has been invoked exceeds the threshold rate of execution; and undo any modifications to the function.

Example Clause E, the method of Example Clause D, wherein the instructions to undo any modifications to the function comprise: initiate a recompilation of the function; intercept a request to recompile the function; pass an original version of the function to the compiler as part of the request to recompile the function.

Example Clause F, the method of Example Clause A, wherein the instructions inserted before the return instruction comprise instructions to invoke a method exit function, and wherein the method exit function comprises the instructions that retrieve the second current system time, compute the elapsed execution time by subtracting the first current system time stored in the local variable from the second current system time, and output the elapsed execution time.

Example Clause G The method of Example Clause A, wherein the function is part of an application that executes within a virtual machine, the method further comprising: receiving, from the application, an activity identifier associated with an activity being performed by the application; executing code within the virtual machine to store the activity identifier in a per-activity variable; and wherein the instructions inserted before the return instruction of the function further include instructions configured to: execute code within the virtual machine to retrieve an individual activity identifier associated with a current invocation of the function.

Example Clause H, the method of Example Clause A, further comprising: determining that the function comprises an asynchronous function, wherein the asynchronous function comprises a plurality of code sections, wherein the asynchronous function is associated with a state machine variable that stores a value associated with a next code section to execute, and wherein the asynchronous function is iteratively re-entered to execute a code section of the plurality of code sections identified by the state machine variable; inserting instructions that, while executing an initial code section of the plurality of code sections, store, in the state machine variable, a reference to an entry in a data structure that contains the first current system time and a state machine value; wherein the instructions inserted before the return statement instruction of the function further include instructions configured to: retrieve the first current system time from the entry in the data structure referenced by the state machine variable, compute a second elapsed execution time by subtracting the first current system time from a third current system time, and output the second elapsed execution time.

Example Clause I, a computing system for automatic performance telemetry comprising: one or more processing units; and a computer-readable medium having encoded thereon computer-readable instructions to cause the one or more processing units to: intercept a runtime compilation of a function (210) into processor executable instructions; determine that the function (210) comprises an asynchronous function (1016), wherein the asynchronous function (1016) comprises a plurality of code sections (1018, 1004B, 1006B, 1008B, 1020), wherein the asynchronous function (1016) is associated with a state machine variable (1022) that stores a state machine value (1024) associated with a next code section to execute, and wherein the asynchronous function (1016) is iteratively re-entered to execute a code section of the plurality of code sections identified by the state machine variable (1022); modify the asynchronous function (1016) by: inserting instructions (1108) configured to retrieve a first current system time; inserting instructions configured to, while executing an initial code section (1018) of the plurality of code sections, store, in the state machine variable (1022), a reference (1106) to a data structure (1110) that contains the first current system time (1106) and a state machine value (1024); identifying a return instruction (1018) within the asynchronous function (1016); inserting, before the return instruction (1018), instructions configured to: retrieve a second current system time, retrieve the first current system time (1106) from the entry in the data structure (1110) referenced by the state machine variable (1022), compute (1116) an elapsed execution time by subtracting the first current system time from the second current system time, and output (1118) the elapsed execution time; and pass the modified asynchronous function (1102) to the compiler (252), causing the compiler (252) to be translated into processor executable instructions.

Example Clause J, the system of Example Clause I, wherein the asynchronous function is further modified by: replacing instructions that retrieve a value from the state machine variable with instructions that retrieve the state machine value from the entry of the data structure referenced by the state machine variable; and replacing instructions that store a value to the state machine variable with instructions that store the value in the entry of the data structure referenced by the state machine variable.

Example Clause K, the system of Example Clause I, wherein the data structure comprises an associative map that associates keys with entries, wherein the reference to the entry in the data structure comprises a key of the associative map, and wherein the entry associated with the key stores the first current system time and the state machine value.

Example Clause L, the system of Example Clause I, wherein the asynchronous function is further modified by: identifying each of the return instructions in the asynchronous function; and inserting instructions before each of the return instructions configured to compute and emit an elapsed execution time from the first current system time.

Example Clause M, the system of Example Clause L wherein the plurality of code sections comprises the initial code section, one or more intermediate code sections, and a final code section, wherein each of the plurality of codes sections ends with a return instruction, and wherein the asynchronous function is further modified by: inserting instructions before a return instruction associated with one or more of the intermediate code sections to: increment a count of intermediate code sections that have been executed, and omit computing the elapsed execution time or omit emitting the elapsed execution time if the count of intermediate code sections that have been executed exceeds a defined threshold.

Example Clause N, the system of Example Clause I, wherein the asynchronous function is a member function of a class, and wherein determining that the function comprises an asynchronous function includes determining if the class inherits from a base class associated with asynchronous functions.

Example Clause O, the system of Example Clause N, wherein the state machine variable is a member variable of the base class, wherein the base class is reflected over to identify a location of the state machine variable within the class, and wherein the instructions inserted into the async function use the location to access the state machine variable.

Example Clause P, the system of Example Clause N, wherein the state machine variable is added to the base class by modifying a metadata description of the base class to include an additional member variable.

Example Clause Q, the system of Example Clause I, wherein the function is further modified by: adding a local variable to the function, inserting instructions configured to store a third current system time in the local variable; inserting, before the return instruction, instructions configured to: compute a second elapsed execution time by subtracting the third current system time stored in the local variable from the second current system time, and output the second elapsed execution time.

Example Clause R, a computer-readable storage medium (1512) having encoded thereon computer-readable instructions (1516, 1518) to cause a computing system (1500) to: intercept a runtime compilation that a virtual machine (214) performs on a function (210), wherein the function (210) is written in intermediate language executable code (404), and wherein the runtime compilation translates the intermediate language executable code (404) into processor executable instructions; modify the function (210) by: modifying a signature (420) of the function (210) to add a local variable (406), inserting instructions configured to retrieve a first current system time and store the first current system time in the local variable (406); identifying a plurality of return instructions (412) within the function (210); inserting, before each of the plurality of return instructions (210), a function call to a method-exit function (504) configured: to retrieve a second current system time, compute an elapsed execution time by subtracting the first current system time stored in the local variable from the second current system time, and output the elapsed execution time; and pass the modified function (422) to the compiler (252), causing the compiler (252) to translate the modified function (422) into processor executable instructions.

Example Clause S, the computer-readable storage medium of Example Clause R, wherein intercepting the runtime compilation comprises registering with a profiler services application program interface (API) implemented by the virtual machine to receive notifications when functions are compiled, wherein the function is modified before an activity-identifier-tracking function written in intermediate language executable code is just-in-time compiled, further comprising: register with the profiler services API to receive a notification when the activity-identifier-tracking function is just-in-time compiled; determine a memory address of the compiled activity-identifier-tracking function; store a copy of the memory address in a global variable, wherein the method-exit function determines that the activity-identifier-tracking function has been compiled before invoking the activity-identifier-tracking function by determining that the global variable comprises a valid function pointer.

Example Clause T, the computer-readable storage medium of Example Clause R, wherein the activity-identifier-tracking function accesses an activity identifier stored in a thread-local variable, an async-local variable, or a session variable.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different items, two different regions, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for automatic performance telemetry, comprising:
   receiving a threshold rate of function execution;
   intercepting a runtime compilation of a function into processor executable instructions;
   modifying the function by:
      adding a local variable to the function,
         inserting instructions configured to retrieve a first current system time and store the first current system time in the local variable;
      identifying a return instruction within the function;
      inserting, before the return instruction, instructions configured to:
         retrieve a second current system time,
         compute an elapsed execution time by subtracting the first current system time stored in the local variable from the second current system time,
         output the elapsed execution time,
         determine a rate at which the function has been invoked,
         determine that the rate at which the function has been invoked exceeds the threshold rate of function execution, and
         remove the inserted instructions from the function; and
   passing the modified function to a runtime compiler, causing the runtime compiler to translate the modified function into processor executable instructions.

2. The method of claim 1, wherein the function is part of an application, the method further comprising:
   receiving, from the application, an activity identifier associated with an activity being performed by the application; and
   wherein the instructions inserted before the return statement instruction of the function further include instructions configured to:
      retrieve an individual activity identifier of an individual activity associated with a current invocation of the function, wherein the individual activity identifier was received from the application, and
      output the individual activity identifier.

3. The method of claim 1, wherein the function is part of an application, the method further comprising:
   receiving, from the application, a function identifier of a root function, wherein each invocation of the root function is associated with a different activity;
   intercepting a request to compile the root function to processor executable instructions;
   modifying the root function by inserting instructions configured to generate an activity identifier;
   passing the modified root function to the compiler, causing the compiler to translate the modified root function into processor executable instructions; and
   wherein the instructions inserted before the return instruction of the function further include instructions configured to:
      retrieve an individual activity identifier of an individual activity associated with a current invocation of the function, wherein the individual activity identifier was generated by the modified root function, and
      output the retrieved individual activity identifier.

4. The method of claim 1, wherein the instructions to remove the inserted instructions from the function comprise:
   initiate a recompilation of the function;
   intercept a request to recompile the function;
   pass an original version of the function to the compiler as part of the request to recompile the function.

5. The method of claim 1, wherein the instructions inserted before the return instruction comprise instructions to invoke a method exit function, and wherein the method exit function comprises the instructions that retrieve the second current system time, compute the elapsed execution time by subtracting the first current system time stored in the local variable from the second current system time, and output the elapsed execution time.

6. The method of claim 1, wherein the function is part of an application that executes within a virtual machine, the method further comprising:
   receiving, from the application, an activity identifier associated with an activity being performed by the application;
   executing code within the virtual machine to store the activity identifier in a per-activity variable; and
   wherein the instructions inserted before the return instruction of the function further include instructions configured to:
      execute code within the virtual machine to retrieve an individual activity identifier associated with a current invocation of the function.

7. The method of claim 1, further comprising:
   determining that the function comprises an asynchronous function, wherein the asynchronous function comprises a plurality of code sections, wherein the asynchronous function is associated with a state machine variable that stores a value associated with a next code section to execute, and wherein the asynchronous function is iteratively re-entered to execute a code section of the plurality of code sections identified by the state machine variable;
   inserting instructions that, while executing an initial code section of the plurality of code sections, store, in the state machine variable, a reference to an entry in a data structure that contains the first current system time and a state machine value;
   wherein the instructions inserted before the return statement instruction of the function further include instructions configured to:
      retrieve the first current system time from the entry in the data structure referenced by the state machine variable,
      compute a second elapsed execution time by subtracting the first current system time from a third current system time, and
      output the second elapsed execution time.

8. A computing system for automatic performance telemetry comprising:
   one or more processing units; and
   a computer-readable medium having encoded thereon computer-readable instructions to cause the one or more processing units to:
      intercept a runtime compilation of a function into processor executable instructions;
      determine that the function comprises an asynchronous function, wherein the asynchronous function comprises a plurality of code sections, wherein the asynchronous function is associated with a state machine variable that stores a state machine value associated with a next code section to execute, and wherein the asynchronous function is iteratively re-entered to execute a code section of the plurality of code sections identified by the state machine variable;

modify the asynchronous function by:
inserting instructions configured to retrieve a first current system time;
inserting instructions configured to, while executing an initial code section of the plurality of code sections, store, in the state machine variable, a reference to a data structure that contains the first current system time and a state machine value;
identifying a return instruction within the asynchronous function;
inserting, before the return instruction, instructions configured to:
retrieve a second current system time,
retrieve the first current system time from the entry in the data structure referenced by the state machine variable,
compute an elapsed execution time by subtracting the first current system time from the second current system time, and
output the elapsed execution time; and
pass the modified asynchronous function to the compiler, causing the compiler to be translated into processor executable instructions.

9. The system of claim 8, wherein the asynchronous function is further modified by:
replacing instructions that retrieve a value from the state machine variable with instructions that retrieve the state machine value from the entry of the data structure referenced by the state machine variable; and
replacing instructions that store a value to the state machine variable with instructions that store the value in the entry of the data structure referenced by the state machine variable.

10. The system of claim 8, wherein the data structure comprises an associative map that associates keys with entries, wherein the reference to the entry in the data structure comprises a key of the associative map, and wherein the entry associated with the key stores the first current system time and the state machine value.

11. The system of claim 8, wherein the asynchronous function is further modified by:
identifying each of the return instructions in the asynchronous function; and
inserting instructions before each of the return instructions configured to compute and emit an elapsed execution time from the first current system time.

12. The system of claim 11 wherein the plurality of code sections comprises the initial code section, one or more intermediate code sections, and a final code section, wherein each of the plurality of codes sections ends with a return instruction, and wherein the asynchronous function is further modified by:
inserting instructions before a return instruction associated with one or more of the intermediate code sections to:
increment a count of intermediate code sections that have been executed, and
omit computing the elapsed execution time or omit emitting the elapsed execution time if the count of intermediate code sections that have been executed exceeds a defined threshold.

13. The system of claim 8, wherein the asynchronous function is a member function of a class, and wherein determining that the function comprises an asynchronous function includes determining if the class inherits from a base class associated with asynchronous functions.

14. The system of claim 13, wherein the state machine variable is a member variable of the base class, wherein the base class is reflected over to identify a location of the state machine variable within the class, and wherein the instructions inserted into the async function use the location to access the state machine variable.

15. The system of claim 13, wherein the state machine variable is added to the base class by modifying a metadata description of the base class to include an additional member variable.

16. The system of claim 8, wherein the function is further modified by:
adding a local variable to the function,
inserting instructions configured to store a third current system time in the local variable;
inserting, before the return instruction, instructions configured to:
compute a second elapsed execution time by subtracting the third current system time stored in the local variable from the second current system time, and
output the second elapsed execution time.

17. A computer-readable storage medium having encoded thereon computer-readable instructions to cause a computing system to:
receive an indication that a tracking function written in intermediate language executable code is just-in-time compiled;
store a memory address of the compiled tracking function in a global variable;
intercept a runtime compilation of a function, wherein the function is written in intermediate language executable code, and wherein the runtime compilation translates the intermediate language executable code into processor executable instructions;
insert, before a return instruction of the function, code that determines that the tracking function has been compiled by determining that the global variable comprises a valid function pointer; and
pass the function to the compiler, causing the compiler to translate the function into processor executable instructions.

18. The computer-readable storage medium of claim 17, wherein the tracking function accesses an activity identifier stored in a thread-local variable, an async-local variable, or a session variable.

* * * * *